United States Patent
Castleman

(10) Patent No.: US 8,286,084 B2
(45) Date of Patent: Oct. 9, 2012

(54) METHODS AND APPARATUS FOR REMOTE INTERACTION USING A PARTITIONED DISPLAY

(75) Inventor: Mark Castleman, Austin, TX (US)

(73) Assignee: Swakker LLC, New York, NY (US)

( * ) Notice: Subject to any disclaimer, the term of this patent is extended or adjusted under 35 U.S.C. 154(b) by 567 days.

(21) Appl. No.: 12/480,421

(22) Filed: Jun. 8, 2009

(65) Prior Publication Data

US 2010/0309195 A1    Dec. 9, 2010

(51) Int. Cl.
*G06F 3/00* (2006.01)
*G06F 3/048* (2006.01)

(52) U.S. Cl. .................... 715/751; 715/753; 715/778

(58) Field of Classification Search .................. 715/751, 715/753, 778
See application file for complete search history.

(56) References Cited

U.S. PATENT DOCUMENTS

| | | | |
|---|---|---|---|
| 4,406,537 A | 9/1983 | Mori | |
| 5,303,388 A | 4/1994 | Kreitman et al. | |
| 5,544,317 A | 8/1996 | Berg | |
| 5,689,620 A | 11/1997 | Kopec et al. | |
| 5,717,879 A | 2/1998 | Moran et al. | |
| 5,899,995 A * | 5/1999 | Millier et al. | 1/1 |
| 5,940,082 A | 8/1999 | Brinegar et al. | |
| 5,990,933 A | 11/1999 | Ozone et al. | |
| 6,343,313 B1 | 1/2002 | Salesky et al. | |
| 6,597,358 B2 | 7/2003 | Miller | |
| 6,654,784 B1 * | 11/2003 | Wei | 709/203 |
| 6,851,053 B1 | 2/2005 | Liles et al. | |
| 7,013,435 B2 | 3/2006 | Gallo et al. | |
| 7,167,191 B2 | 1/2007 | Hull et al. | |
| 7,213,051 B2 | 5/2007 | Zhu et al. | |
| 7,222,305 B2 | 5/2007 | Teplov et al. | |
| 7,266,768 B2 | 9/2007 | Ferlitsch et al. | |
| 7,313,595 B2 | 12/2007 | Rust | |
| 7,349,944 B2 | 3/2008 | Vernon et al. | |
| 7,398,295 B2 * | 7/2008 | Shoroff et al. | 709/204 |
| 7,418,606 B2 | 8/2008 | Holmer | |
| 7,421,069 B2 | 9/2008 | Vernon et al. | |

(Continued)

FOREIGN PATENT DOCUMENTS

EP        1564992        8/2005

(Continued)

OTHER PUBLICATIONS

Mover+, Infinite Labs, Mar. 4, 2010. [online] [retrieved on Mar. 19, 2010] Retrieved from iTunes Preview, http://itunes.apple.com/WebObjects/MZStore.woa/wa/viewSoftware?id-320907954&mt=8, 3 pgs.

(Continued)

*Primary Examiner* — David Phantana Angkool
(74) *Attorney, Agent, or Firm* — Cooley LLP

(57) ABSTRACT

In some embodiments, a processor-readable medium includes code representing instructions to cause a processor to perform a process. The code stored by the processor-readable medium includes code to cause the processor to allocate a portion of a display screen of a first device to be uniquely associated with a second device and to send to the second device a directive representing a symbol appearing on the display screen when a user-selected indicator is received. The user-selected indicator is associated with the portion of the display screen of the first device. The first device is mutually exclusive from the second device.

21 Claims, 11 Drawing Sheets

U.S. PATENT DOCUMENTS

| | | | |
|---|---|---|---|
| 7,424,718 B2 | 9/2008 | Dutton | |
| 7,458,013 B2 | 11/2008 | Fruchter et al. | |
| 7,464,137 B2 | 12/2008 | Zhu et al. | |
| 7,487,467 B1 | 2/2009 | Kawahara et al. | |
| 7,512,659 B2 | 3/2009 | Keohane et al. | |
| 7,516,410 B2 | 4/2009 | Thompson et al. | |
| 7,953,870 B1 | 5/2011 | Reeves et al. | |
| 8,054,294 B2 * | 11/2011 | Sakai et al. | 345/169 |
| 8,184,066 B2 * | 5/2012 | Chung et al. | 345/1.2 |
| 2002/0181398 A1 | 12/2002 | Szlam | |
| 2004/0189669 A1 | 9/2004 | David et al. | |
| 2005/0114523 A1 | 5/2005 | Barron et al. | |
| 2005/0140694 A1 | 6/2005 | Subramanian et al. | |
| 2005/0273510 A1 | 12/2005 | Schuh | |
| 2006/0033738 A1 | 2/2006 | Wilkinson | |
| 2006/0089198 A1 | 4/2006 | Sawatani et al. | |
| 2006/0165060 A1 | 7/2006 | Dua | |
| 2006/0214935 A1 | 9/2006 | Boyd et al. | |
| 2006/0242554 A1 | 10/2006 | Gerace et al. | |
| 2006/0259731 A1 | 11/2006 | Oshins et al. | |
| 2006/0282855 A1 | 12/2006 | Margulis | |
| 2006/0284785 A1 * | 12/2006 | Bitterlich | 345/1.1 |
| 2007/0027960 A1 * | 2/2007 | De Leon | 709/217 |
| 2007/0070233 A1 | 3/2007 | Patterson | |
| 2007/0078004 A1 | 4/2007 | Suzuki et al. | |
| 2007/0133524 A1 | 6/2007 | Kwon | |
| 2007/0142039 A1 | 6/2007 | Bushnell et al. | |
| 2007/0150918 A1 | 6/2007 | Carpenter et al. | |
| 2007/0156810 A1 | 7/2007 | Kumar | |
| 2007/0156923 A1 | 7/2007 | Kumar | |
| 2007/0191028 A1 | 8/2007 | Hinckley et al. | |
| 2007/0192329 A1 | 8/2007 | Croft et al. | |
| 2007/0217430 A1 | 9/2007 | Baird et al. | |
| 2007/0226299 A1 | 9/2007 | Shaffer et al. | |
| 2007/0230896 A1 | 10/2007 | Wang et al. | |
| 2008/0070495 A1 | 3/2008 | Stricklen et al. | |
| 2008/0100620 A1 | 5/2008 | Nagai et al. | |
| 2008/0133736 A1 | 6/2008 | Wensley et al. | |
| 2008/0168274 A1 | 7/2008 | Natanzon et al. | |
| 2008/0218728 A1 | 9/2008 | Kirschner | |
| 2008/0250149 A1 | 10/2008 | Morris | |
| 2008/0294462 A1 | 11/2008 | Nuhaan et al. | |
| 2009/0061950 A1 | 3/2009 | Kamachi et al. | |
| 2009/0110368 A1 | 4/2009 | Nelson et al. | |
| 2009/0182843 A1 | 7/2009 | Hluchyj et al. | |
| 2009/0324083 A1 | 12/2009 | Campbell et al. | |
| 2010/0085317 A1 * | 4/2010 | Park et al. | 345/173 |
| 2010/0138748 A1 | 6/2010 | Sankararao et al. | |
| 2010/0157978 A1 | 6/2010 | Robbins et al. | |
| 2010/0269039 A1 * | 10/2010 | Pahlavan et al. | 715/702 |
| 2011/0314093 A1 * | 12/2011 | Sheu et al. | 709/203 |

FOREIGN PATENT DOCUMENTS

| | | |
|---|---|---|
| EP | 1868317 A1 | 12/2007 |
| EP | 1890262 A1 | 2/2008 |
| EP | 2023587 A1 | 2/2009 |
| WO | WO 2006/074822 A1 | 7/2006 |
| WO | WO 2007/003712 | 1/2007 |
| WO | WO 2007/102453 | 9/2007 |

OTHER PUBLICATIONS

International Search Report and Written Opinion of the International Searching Authority for PCT/US2010/037747 dated Sep. 8, 2010, 12 pp.

International Search Report and Written Opinion of the International Searching Authority for PCT/US2010/037746 dated Sep. 21, 2010, 10 pp.

International Search Report and Written Opinion of the International Searching Authority for PCT/US2010/037745 dated Sep. 10, 2010, 11 pp.

Nonfinal Office Action mailed Jan. 21, 2011 for U.S. Appl. No. 12/480,404, filed Jun. 8, 2009.

Final Office Action mailed Aug. 5, 2011 for U.S. Appl. No. 12/480,404, fuled Jun. 8, 2009.

Nonfinal Office Action mailed Mar. 2, 2011 for U.S. Appl. No. 12/480,413, filed Jun. 8, 2009.

Final Office Action mailed Oct. 25, 2011 for U.S. Appl. No. 12/480,413, filed Jun. 8, 2009.

International Search Report and Written Opinion of the International Searching Authority for PCT/US2011/020579 dated Apr. 18, 2011, 9 pp.

International Search Report and Written Opinion of the International Searching Authority for PCT/US2011/020581 dated Apr. 19, 2011, 8 pp.

Nonfinal Office Action mailed Jan. 30, 2012 for U.S. Appl. No. 12/480,416, filed Jun. 8, 2009.

Nonfinal Office Action mailed Dec. 21, 2011 for U.S. Appl. No. 12/480,422, filed Jun. 8, 2009.

Nonfinal Office Action mailed Feb. 3, 2012 for U.S. Appl. No. 12/480,435, filed Jun. 8,2009.

Nonfinal Office Action mailed Aug. 10, 2012 for U.S. Appl. No. 12/480,432, filed Jun. 8, 2009.

* cited by examiner

Directive 109
| Description Portion 119 | Content Portion 129 |

FIG. 1B

METHODS AND APPARATUS FOR REMOTE INTERACTION USING A PARTITIONED DISPLAY

RELATED APPLICATION

This application is related to co-pending U.S. patent application Ser. No. 12/480,416, filed on Jun. 8, 2009 and entitled "METHODS AND APPARATUS FOR REMOTE INTERACTION USING A PARTITIONED DISPLAY," which is incorporated herein by reference in its entirety.

BACKGROUND

Interaction between mobile communication devices in known. Email, texting, and file sharing are all examples of interaction between and usage of communication devices. Further, many systems, such as gaming systems, allow a user to play video games wirelessly against another user.

Known methods of remote interaction, however, can be complicated and platform specific. A user of a first type of device might not be able to interact with a user of a second type of device. Further, known methods of remote interaction can be unfriendly to the users. For example, known methods of remote interaction can be difficult to initiate and/or use once initiated.

Accordingly, a need exists for method and apparatus that allows simple, platform independent interaction between communication devices. Additionally, a need exists for a user-friendly methods and apparatus for initiating and participating in such interaction.

SUMMARY

In some embodiments, a processor-readable medium includes code representing instructions to cause a processor to perform a process. The code stored by the processor-readable medium includes code to cause the processor to allocate a portion of a display screen of a first device to be uniquely associated with a second device and to send to the second device a directive representing a symbol appearing on the display screen when a user-selected indicator is received. The user-selected indicator is associated with the portion of the display screen of the first device. The first device is mutually exclusive from the second device.

BRIEF DESCRIPTION OF THE DRAWINGS

FIG. 1B is an illustration of a directive including a directive description portion and a directive content portion, according to an embodiment.

DETAILED DESCRIPTION

In some embodiments, a method includes receiving a directive from a first device, storing the directive and sending the directive to a second device. The directive includes an indicator of a location on a display screen of the first device of a symbol. The directive is sent to the second device when a user-selected indicator is received. The user-selected indicator is associated with an area on the display screen of the first device uniquely associated with the second device.

In some embodiments, a user of a first device can send a directive associated with a symbol displayed on a display of the first device to a second device when the user provides an indication associated with a portion of the display of the first device. The portion of the display of the first device is uniquely associated with the second device. The directive can cause the symbol to be displayed on a display of the second device.

In some embodiments, for example, the user can trace one or more glyphs in the portion of the display of the first device associated with the second device. A directive associated with the one or more glyphs can be sent to the second device causing the second device to display the one or more glyphs on the display of the second device. Similarly, in other embodiments, a user can select one or more symbols and can trace a path to or in the direction of the portion of the display of the first device associated with the second device.

As used in this specification, the singular forms "a," "an" and "the" include plural referents unless the context clearly dictates otherwise. Thus, for example, the term "a communication device" is intended to mean a single communication device or multiple communication devices; and "network" is intended to mean one or more networks, or a combination thereof.

As used herein, the term symbol means a representation of visual data. For example, a symbol can include one or more images and/or glyphs. A symbol can also include video data. Further, in some embodiments, a symbol can include an image (e.g., an icon) and/or a glyph that represents and/or is associated with a media resource such as an audio file and/or an image resource. A symbol can be displayed on a portion of a display of a device.

Figure 1A:
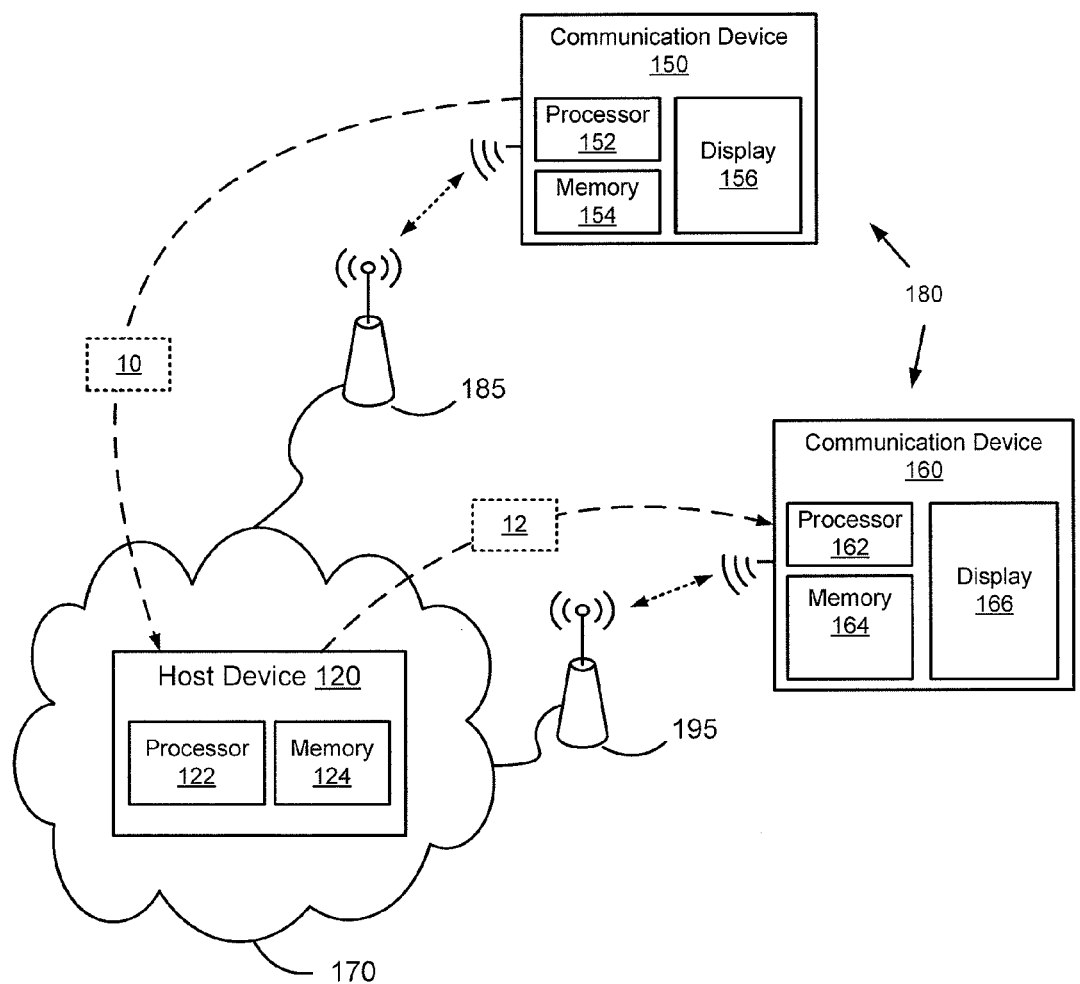
FIG. 1A is a schematic diagram that illustrates communication devices in communication with a host device via a network, according to an embodiment.

FIG. 1A is a schematic diagram that illustrates communication devices 180 in communication with a host device 120 via a network 170, according to an embodiment. Specifically, communication device 150 is configured to communicate wirelessly with the host device 120 via a gateway device 185. Similarly, communication device 160 is configured to communicate wirelessly with the host device 120 via a gateway device 195. The network 170 can be any type of network (e.g., a local area network (LAN), a wide area network (WAN), a virtual network, a telecommunications network) implemented as a wired network and/or wireless network with one or more segments in a variety of environments such as, for example, an office complex.

The host device 120 can be any type of device configured to send data over the network 170 to and/or receive data from one or more of the communication devices 180. In some embodiments, the host device 120 can be configured to function as, for example, a server device (e.g., a web server device), a network management device, and/or so forth.

In some embodiments, the host device 120 can be configured to host a communications session, which the communication devices 180 can join. A communications session can be a connection or relationship such as, for example, a logical connection, a virtual connection, or physical connection between one or more communication devices and a communications session controller. Individual connections (e.g., logical, virtual, or physical) between a single communication device and a communications session controller can be referred to as communications session links. A communications session can include the communications session controller and the communications session links between communication devices and the communications session controller. Thus, communication devices can communicate (e.g., send directives to) one with another via the communications session by passing or relaying that communication through a communications session controller hosted at a host device via communications session links. In other words, each communication device can send directives to the communications session controller via communication session links, and the communications session controller can distribute those directives to the other communication devices connected to (or associated with) the communications session via other communications session links. This process can be referred to as communicating (e.g., sending and receiving directives) via the communications session.

A communications session controller can function as a hub or central relay for distribution of directives among communication devices that are associated with a communications session. Communication devices 180 can associate with or join a communications session by establishing a communications session link with a communications session controller, and can send directives to and receive directives from other communication devices that are also connected to the communications session via the communications session. For example, it is generally difficult for two communication devices that are behind separate network address translation ("NAT") appliances to communicate one with another. Each communication device, however, can separately connect to a communications session controller, which is generally not behind a NAT appliance, and communicate via or through the communications session. In other words, the communication devices can each send directives to the communications session controller via a communications session link, and can receive directives from the communications session controller via that or another communications session link. In addition to providing connectivity or communication between two communication devices, a communications session can provide connectivity among many communication devices connected to or associated with the communications session. Furthermore, in some embodiments, one platform or type of communication device can send directives to a communications session controller in a common format, and the communications session controller can distribute the directives to communication devices of another platform in another format that is compatible with that platform. In other words, communication devices of various platforms that cannot natively communicate one with another can communicate one with another via the communications session.

A communications session controller can be implemented as software (e.g., source code, object code, one or more scripts, or instructions) stored at a memory and operable to be executed and/or interpreted or compiled at a processor operatively coupled to the memory. In other words, a communications session controller can be hosted at a host device such as a server, and a server can host multiple communications session controller simultaneously. For example, a communications session controller can be an application (or an instance of an application) hosted at host device 120 illustrated in FIG. 1.

Because a communications session controller can be hosted at a host device, interaction with that communications session controller (e.g., sending directives to or via and received from or via a communications session) can be discussed as interaction with the communications session controller itself, or as interaction with the host device at which the communications session controller is hosted. For example, a directive can be discussed as being sent to the communications session controller, or can be discussed as being sent to the host device.

Alternatively, the directive can be discussed as being sent to one or more communication devices via the communications session. Such expressions are generally interchangeable. In other words, a directive sent via a communications session can be sent to the host device at which processing associated with the communications session (e.g., storing or sending to a moderator) can be completed (e.g., by a communications session controller software module) before the directive is forwarded to one or more communication devices by a communications session controller.

Similarly, for example, a directive can be discussed as being stored by a host device or by a communications session controller (e.g., an instance of a software module hosted at the host device). Said differently, a host device can include the physical hardware that effects processing (e.g., sending, receiving, interpreting, storing, etc.) of directives, and the communications session controller can provide control signal that trigger or effect such processing.

In some embodiments, each communications session controller hosted at a host device can be a separate or distinct application, software module, or instance of the same at the host device associated with a single communications session. In other words, a separate communications session controller (e.g., a process) can exist at a processor of a host device for each communications session at that host device.

In some embodiments, a single application, software module, or instance of the same at a host device can process directives of or related to multiple communications sessions. For example, directives can include a communications session identifier which is used by a process at a processor of the host device to determine with which communications session that directive is related. Based on the communications session identifier, the host device (or the process at the host device) can determine, for example, to which communication devices the directive should be forwarded, whether the directive should be sent to a moderator, and/or other processing.

Thus, a communications session can include, for example, communications session controller that is an instance of a software module at a host device, and/or a collection of directives collectively associated with a communications session identifier. Similarly, multiple communications session controllers can be associated with a communications session to collectively or in parallel process (e.g., receive, store, send, etc.) directives that are sent via that communications module.

In some embodiments a communications session controller can be implemented as one or more hardware modules such as, for example, an application specific integrated circuit ("ASIC"), a field-programmable gate array ("FPGA"), a processor, or other hardware device. In some embodiments, a communications session controller can be implemented at both a hardware module and a software module. In some embodiments, such a module can be referred to as a communications session module (or communications session controller module). Additionally, in some embodiments, a communications session (or a communications session controller) includes one or more portions of one or more memories for storing directives. For example, a communications session controller can be associated with a portion of a local random-access memory ("RAM") and a portion of a remote database such that directives can be stored within the communications session controller locally at the RAM and remotely at the database. For example, memory 125 illustrated in FIG. 1 can be configured as a database, and a communications session controller hosted at host device 120 can store directive at memory 125. In some embodiments, a communications session controller can use a portion of a local RAM as a memory cache for a remote database.

Communications sessions can be opened or initiated by communication devices 180 (e.g., a communication device can send a communications session initiation request to a server configured to host communications session), and other communication devices can be invited or authorized to join the communications session. After the communication devices have joined the communications session, the communication devices can send directives to and receive directives from one another via the communications session. In other words, the communication devices can send directives to a communications session controller, and the communications session controller can forward or distribute those directives via the communications session links of the communications session. Said differently, the communication devices can send directives to the host device hosting the communications session controller via the communications session links, and the host device can forward or distribute those directives via the communications session links. In some embodiments, directives can be broadcast to all communication devices associated with (or that have joined) the communications session. In some embodiments, directives can be addressed to a particular communication device or group of communication devices that have joined the communications session. When the communication devices have completed communicating via the communications session, the communications session can be closed.

In some embodiments, a communications session controller can store or record the directives that are distributed through the communications session. In other words, the communications session controller can produce an archive of the individual directives that are distributed via the communications session. Thus, a communication device can access directives distributed via a communications session (e.g., while the communications session was open or active) after the communications session has closed (or is inactive) to receive or access those directives. Additionally, a communication device can access a history of directives that have been distributed by a currently open (or active) communications session. Said differently, a communications session controller can include an archive of the activity (e.g., the directives distributed) within or via that communications session.

Communications sessions can include properties, characteristics, parameters, and/or rules that define or describe how communication devices connect to a communications session, which directive classes can be distributed by a communications session, what level of permissions are required to join or initiate a communications session, security options and/or requirements of a communications session (e.g., type and/or strength of encryption used within a communications session), and/or other characteristics. In some embodiments, a communications session can be monitored or observed by a moderator such as a communication device referred to as a moderator device. The communications session controller can request approval or authorization from the moderator before performing certain actions. For example, the communications session controller can send a request for authorization to initiate and/or close the communications session. Additionally, the communications session controller can send a request for authorization to distribute directives of certain directive classes.

In some embodiments, a communications session controller can store directives in a local memory while the communications session is open or active, and archive the directives to another (possibly remote) memory such as a database, network attached storage ("NAS") device or some other archive memory. In some embodiments, a communications session controller stores directives locally and at an archive memory during operation of the communications session (e.g., while the communications session is active). In some embodiments, a local memory can be a volatile memory such as a RAM, and an archive memory can be a non-volatile memory such as, for example, a magnetic disk or a FLASH or other solid-state memory. In some embodiments, a host device can receive a request for access to the directives of a closed communications session from a communication device, and the host device can provide the directives of that communications session (e.g., archived directives) to that communications device.

In some embodiments, one or more portions of the host device 120 (e.g., a virtual switch module, not shown in FIG. 1A) and/or one or more portions of the communication devices 180 can include a hardware-based module (e.g., a digital signal processor (DSP), a field programmable gate array (FPGA)) and/or a software-based module (e.g., a module of computer code, a set of processor-readable instructions that can be executed at a processor). In some embodiments, one or more of the functions associated with the host device 120 (e.g., the functions associated with the processor 122) can be included in one or more modules. In some embodiments, one or more of the functions associated with the communication devices 180 (e.g., functions associated with processor 152) can be included in one or more modules. In some embodiments, communication device 150 can be configured to perform one or more functions associated with communication device 160, and vice versa. In some embodiments, one or more of the communication devices 180 can be configured to perform one or more functions associated with the host device 120, and vice versa.

In some embodiments, each of the communication devices 180 can be, for example, a computing entity (e.g., a personal computing device), a mobile phone, a monitoring device, a personal digital assistant (PDA), and/or so forth. Although not shown, in some embodiments, each of the communication devices 180 can have one or more network interface devices (e.g., a network interface card). In some embodiments, each of the communication devices 180 can function as a source device and/or as a destination device. Although shown as wireless communication devices in FIG. 1A, in some embodiments, one or more of the communication devices 180 can be configured to communicate over the network 170 via a wire, or alternatively can be a wired communication device without wireless communication capabilities. In some embodiments, the communication devices 180 can be referred to as client devices.

As shown in FIG. 1A, the communication device 160 has a processor 162, a memory 164, and a display 166. The memory 164 can be, for example, a random access memory (RAM), a memory buffer, a hard drive, and/or so forth. In some embodiments, the display 166 of the device 160 can be a touch-screen display such that the processor 162 receives sensor data when a user touches the display 166 of the device 160. For example, a user can select a symbol displayed on the display 166 by touching the portion of the display 166 displaying the symbol. Sensor data can indicate a location on the display 166 of the user's selection. In some embodiments, the user can move a finger across the display to produce sensor data having a direction, speed, acceleration and/or the like. In such embodiments, the display 166 can display a symbol moving with a substantially similar path, speed and/or acceleration as the user's finger. A symbol displayed at a first portion of the display 166 can be moved and displayed at a second portion of the display 166 when a user selects the symbol with a finger and moves the finger across the display 166 from the first portion of the display 166 to the second portion of the display 166. In some embodiments, the sensor data can be compressed and sent to another communication device via a directive, as further described in detail herein. In other embodiments, the display can display a pointer associated with a pointing device, such as a mouse, joystick, keyboard, and/or the like. In such embodiments, a user can use the pointing device to select and/or move a symbol displayed on the display.

As shown in FIG. 1A, the processor 162 of the communication device 160 is configured to receive a directive 12 from host device 120. The directive 12, can be similar to the directive 109 shown and described below in relation to FIG. 1B and/or the directives shown and described in co-pending U.S. patent application Ser. No. 12/480,404, filed on Jun. 8, 2009, and entitled "METHODS AND APPARATUS FOR DISTRIBUTING, STORING, AND REPLAYING DIRECTIVES WITHIN A NETWORK," co-pending U.S. patent application Ser. No. 12/480,413, filed on Jun. 8, 2009 and entitled "METHODS AND APPARATUS FOR DISTRIBUTING, STORING, AND REPLAYING DIRECTIVES WITHIN A NETWORK," co-pending U.S. patent application Ser. No. 12/480,422, filed on Jun. 8, 2009, and entitled "METHODS AND APPARATUS FOR DISTRIBUTING, STORING, AND REPLAYING DIRECTIVES WITHIN A NETWORK," and co-pending U.S. patent application Ser. No. 12/480,435, filed on Jun. 8, 2009 the same date, and entitled "METHODS AND APPARATUS FOR DISTRIBUTING, STORING, AND REPLAYING DIRECTIVES WITHIN A NETWORK," each of which is incorporated herein by reference in its entirety.

In some embodiments, the processor 162 can be configured to display a symbol on the display 166 based on one or more portions of the directive 12. For example, the processor 162 can be configured to display a symbol associated with the directive 12 on the display 166. In some embodiments, the directive 12 can be configured to trigger processing of (e.g., rendering of, display of) a media resource such as a visual resource (e.g., a symbol) and/or an audio resource. For example, in some embodiments, the directive 12 can include compressed sensor data that can be used to trigger display of a glyph (e.g., an alphanumeric letter, an outline of a shape).

Similar to communication device 160, the communication device 150 has a processor 152, a memory 154, and a display 156. The display 156 can be similar to the display 166. As shown in FIG. 1A, the communication device 150 can be configured to define a directive 10 that can be sent to host device 120. The directive 10 can be defined at the communication device 150 in response to an interaction of a user with the communication device 150. For example, in some embodiments, the directive 10 can include compressed sensor data produced based on an interaction of a user with the display 156 or other type of user interface (not shown) associated with (e.g., included in) the communication device 150. In some embodiments, communication device 150 can be configured to perform a function associated with communication device 160, and vice versa.

In some embodiments, the directive 12 can be associated with the directive 10. For example, in some embodiments, the directive 12 can be a copy of the directive 10. In other words, the directive 10 can be pushed to the host device 120 from communication device 150, copied at the host device 120, and forwarded (pushed or pulled) from the host device 120 to the communication device 160 as directive 12. In some embodiments, the directive 12 can be defined at a processor 122 of the host device 120 based on the directive 10. For example, the directive 12 can have a data portion (e.g., a payload portion) equal to directive 10, but directive 12 can have routing portion that is different than a routing portion included in directive 10. The different routing portion can be defined at the host device 120.

In some embodiments, the directive 12 and/or directive 10 can be stored at a memory 124 of the host device 120. For example, the directive 12 can be stored at the host device 120 until the directive 12 is requested by communication device 160. In response to the request, the directive 12 can be sent to the communication device 160. In some embodiments, the directive 10 can be stored at the memory 124 of the host device 120 until a request for a directive is received from the communication device 160. In response to the request, the host device 120 can be configured to define directive 12 based on directive 10 and can send directive 12 to the communication device 160. In other words, the directive 12 can be pulled from the host device 120 by the communication device 160.

In some embodiments, the directives 10, 12 are platform independent. Said another way, the directives have a standardized format (see e.g., FIG. 1B) and can be interpreted by various communication devices. Accordingly, even if the communication device 150 is a first type of communication device running a first platform and the communication device 160 is a second type of communication device running a second platform, both devices can define, send, receive and interpret directives.

FIG. 1B is an illustration of a directive 109 including a directive description portion 119 and a directive content portion 129, according to an embodiment. In some embodiments, directive 109 can include additional portion such as, for example, a length or size portion including a length (e.g., in bytes or bits) of directive 109. Directive description portion 119 can include an identifier or other indicator of a type or class of directive 109. In other words, directive description portion 119 can include a directive class or type identifier. In some embodiments, directive description portion 119 can describe or provide an indication of the contents or format of directive content portion 129. For example, directive description portion 119 can indicate that directive content portion 129 includes one or more of, for example, video data, audio data, image data, textual data, numeric data (e.g., one or more groups of bits representing signed integer values, one or more groups of bits representing unsigned integer values, and/or one or more groups of bits representing floating-point values), operational instructions, and/or control commands.

A communication device or a communications session can access or read directive description portion 119, to determine how to process or interpret directive 109 or a portion of directive 109 such as directive data portion 129. For example, a communications module can determine how to parse a binary bit string or sequence included in directive content portion 129 based on a directive class identifier included in directive description portion 119. In some embodiments, directive content portion 129 can include encoded data such as, for example, hexadecimal-encoded data or base64-encoded data. A directive class identifier included in directive description portion 119 can provide an indication to, for example, a communication device of the encoding scheme (or schemes) with which the data included in directive content portion 129 is encoded (e.g., a hexadecimal-encoding data scheme or a base64-encoding scheme). In some embodiments, directive content portion 129 can include data representing instructions or commands to be executed by a communication device that receives directive 109. Such instructions or commands can include parameters, characteristics, and/or arguments that can be interpreted or used by a communication device during execution of one or more instructions or commands, and can be referred to as directive parameters or characteristics.

For example, directive content portion 129 can include drawing instructions generated, for example, in response to user input at a first communication device. The drawing instructions can include parameters (or characteristics or arguments) such as, for example, lines, arcs, geometric figures (e.g., circles, ellipses, and/or polygons), paths, and/or groups of points. A communication device receiving directive 109 can determine how to interpret (or process) the drawing instructions and/or parameters based on directive description portion 119, and draw one or more symbols at a display operatively coupled to that communication device based on the drawing instructions and parameters. Said differently, a display module of a communication device receiving directive 109 can trace or display lines, arcs, paths, geometric figures, and/or points defined within a drawing instruction at a display of that communication device. In other words, a communication device receiving directive 109 can reproduce a symbol such as an image, a glyph, or a collection of the same that is described by one or more drawing instructions included in directive description portion 129.

In some embodiments, a drawing instruction can include additional parameters such as, for example, line, arc, path, geometric figure, and/or point weights and/or colors, drawing speed or velocity (e.g., a rate at which lines, arcs, paths, geometric figures, and/or points are drawn or painted to a display operatively coupled to a communication device receiving directive 109), times (e.g., a time period within which lines, arcs, paths, geometric figures, and/or points are drawn or painted to a display operatively coupled to a communication device receiving directive 109), and/or directionalities (e.g., in which direction to paint or trace a line). In some embodiment, a communication device can include user drawing preferences configured to function as defaults for drawing parameters or instructions that are not included in directive content portion 129. For example, a directive class identified by directive description portion 119 can include a drawing instruction that defines a line, but does not define a line weight or color as a parameter. One or more user drawing preferences at a communication device receiving directive 109 can be used by, for example, a display module of that communication device to determine or select a line weight and/or color for the line defined within the drawing instruction of directive content portion 129.

In some embodiments, directive content portion 129 can include image data and/or position and/or orientation data related to one or more images. For example, directive content portion 129 can include a group of base64-encoded images and position and orientation information or instructions for those images. In other words, a communication device can receive directive 109, determine the contents of directive 109 based on a directive class identifier included in directive description portion 119, and display images included in directive content portion 129 at display positions defined (or described) by position parameters of directive description portion 129 and in orientations (e.g., rotational offsets) defined (or described) by orientation parameters of directive description portion 129.

In some embodiments, directive 109 can include multiple directive content portions. For example, directive 109 can include images as hexadecimal-encoded image data within directive content portion 129, and position parameters, orientation parameters, and/or other parameters related to those images within another directive content portion 129. In some embodiments, directives can be complimentary. For example, directive 109 can include images as binary image data (e.g., within directive content portion 129), and another directive can include position parameters, orientation parameters, and/or other parameters related to the images included in directive 109.

Figure 2:
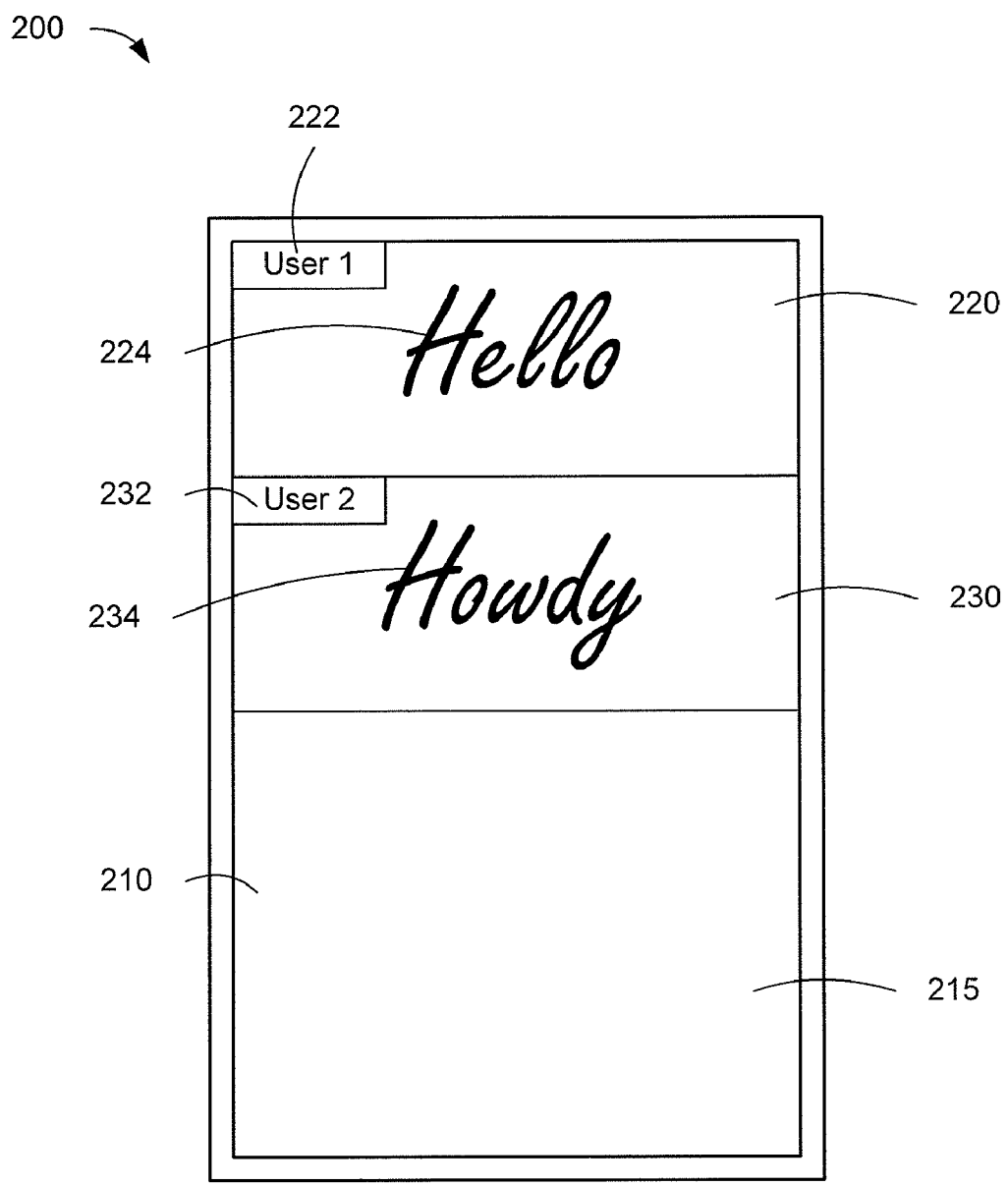
FIGS. 2-5 are a schematic illustrations of displays of communication devices, according to embodiments.

FIG. 2 is a schematic illustration of a display 210 of a communication device 200, according to an embodiment. The communication device 200 includes a processor (not shown) and a memory (not shown) and can be substantially similar to communication devices 180 shown and described in relation to FIG. 1A. In some embodiments, the communication device 200 is a mobile communication device. In other embodiments, the device is a non-mobile (e.g., stationary, desktop) communication device.

The display 210 of the communication device 200 can be a touch-sensitive display structurally and functionally similar to the displays 156, 166 shown and described in FIG. 1A. In other embodiments, the display can display a pointer associated with a pointing device, such as a mouse, joystick, keyboard, and/or the like.

The display 210 includes a first portion 220, a second portion 230 and a third portion 215. The first portion 220 of the display 210 is uniquely associated with a first remote device (not shown) such that when a user-selected indicator associated with the first portion 220 of the display 210 is received by the processor of the device 200, a directive is sent to the first remote device via a communications session. For example, in the embodiment shown in FIG. 2, and as further described herein, a directive containing content representing one or more glyphs 224 can be sent to the first remote device when the user of the communication device 200 traces the one or more glyphs 224 within the first portion 220 of the display 210. In such embodiments, the directive sent to the first remote device can be stored in a memory of a host device and can instruct a processor of the first remote device to display the one or more glyphs on a display of the first remote device.

In some embodiments, meta-data about the first portion 220 of the display 210 and/or the first remote device is stored in the memory of the communication device 200. Such meta-data can include device identification data (e.g., IP address, user information) and/or data about a communications session (e.g., duration, devices connected, address of a host).

In some embodiments, the first portion 220 of the display 210 includes a device identifier 222. The device identifier 222 displays a symbol associated with the first remote device within the first portion 220 of the display 210. This allows a user of the communication device 200 to determine that the first portion 220 of the display 210 is associated with the first remote device. In other words, the device identifier 222 provides an indication that the first portion 220 of the display 210 is associated with the first remote device. In other embodiments, the symbol associated with the first remote device is displayed on a portion of the display representing a key that lists portions of the display and the devices associated with the portions of the display.

The device identifier 222 can be any symbol displayed on the display 210 indicating that the first portion 220 of the display 210 is uniquely associated with the first remote device. For example, the device identifier 222 can be glyphs displayed on the display 210 representing a name of the first remote device, glyphs displayed on the display 210 representing a name of a user of the first remote device, an image displayed on the display 210 associated with the user of the first remote device and/or the like.

The second portion 230 of the display 210 is uniquely associated with a second remote device (not shown) such that when a user-selected indicator associated with the second portion 230 is received by the processor of the device 200, a directive is sent to the second remote device via a host device and/or a communications session hosted by the host device. For example, similar to the first portion 220, in the embodiment shown in FIG. 2, and as further described herein, a directive containing an instruction representing one or more glyphs can be sent to the second remote device when a user of the communication device 200 traces the one or more glyphs 234 within the second portion 230 of the display 210. In such embodiments, the directive sent to the second remote device can be stored in a memory of a host device and can instruct a processor of the second remote device to display the one or more glyphs on a display of the second remote device. Additionally, in some embodiments, the second portion 230 of the display 210 includes a device identifier 232 uniquely identifying the second portion 230 as being associated with the second remote device. Further, in some embodiments, metadata about the second portion 230 of the display 210 and/or the second remote device is stored in the memory of the communication device 200. The first portion 220 of the display 210 can be mutually exclusive of the second portion 230 of the display 210.

The third portion 215 of the display 210 is not associated with another device. Accordingly, the third portion 215 of the display 210 can be used to perform tasks local to the communication device 200 and/or tasks not associated with the first remote device or the second remote device. In other embodiments, and as further described herein, directives associated with symbols displayed in the third portion of the display can be sent to either the first remote device or the second remote device when the user provides an indication in the first portion of the display or the second portion of the display, respectively.

In use, an indication to associate the first portion 220 of the screen with the first remote device is received by the processor of the communication device 200. In some embodiments, this indication can be a result of sensor data produced by a user selection on the display 210 of the communication device 200. The indication to associate the first portion 220 of the screen with the first remote device can also be received from a host device in response to the first remote device requesting to associate with a communications session with which the communication device 200 is currently associated, or to which the communication device 200 has been invited.

In some embodiments, a user can determine the location and size of the portion of the display 210 to associate with the first remote device. For example, in some embodiments, the user can trace an outline of the portion (e.g., the first portion 220) of the display 210 to be associated with the first remote device with a finger. In such embodiments, the processor receives sensor data produced by the user tracing the outline of the portion and allocates the area encompassed by the outline as being associated with the first remote device.

In other embodiments, a user can touch the display in the general area of the portion of the display that the user would like to associate with the first remote device. In such embodiments, the processor can receive sensor data produced by the user touching the display and associate a portion of the display substantially centered around the portion of the display touched by the user. In such embodiments, the size and/or shape of the area can be predetermined.

In yet other embodiments, a host device can determine which portion of the display will be associated with the first remote device. In such embodiments, the portion of the display can have a predetermined size, a predetermined shape, and a predetermined location on the display.

In some embodiments, once the location on the display 210 first portion 220 of the display 210 has been established, a user of the communication device 200 can move the first portion 220 of the display 210 to another portion of the display 210. Said another way, the user of the communication device 200 can determine where on the display 210 the first portion 220 should be displayed. Accordingly, the location on the display 210 of the first portion 220 can be tailored to accommodate the particular display parameters of the communication device 200 and/or the user's preferences.

In some embodiments, the first portion 220 of the display 210 can be associated with the first remote device by linking the coordinates of the first portion 220 on the display with an address of the first remote device. For example, a communications session at a host device that links the communication device 200 to the first remote device can include a table linking the coordinates of the first portion 220 on the display 210 with the address (e.g., IP address) of the first remote device. In other embodiments, such a table can be included within the memory of the communication device.

In some embodiments, before the first portion 220 of the display 210 is associated with the first remote device, the first remote device receives an indication that the communication device 200 is attempting to associate with a communications session with which the first remote device is associated. Once a user of the first remote device authorizes the definition of the communications session, then the first portion 220 of the display screen 210 can be associated with the first remote device via the communications session.

Once the first portion 220 of the display 210 is associated with the first remote device via a communications session, the communication device 200 can send directives to the first remote device. For example, as shown in FIG. 2, a user of the communication device 200 can trace glyphs 224 within the first portion 220 of the display 210. In some embodiments, the user can use a finger to trace one or more glyphs 224 on the display 210 to define a message (e.g., Hello), a drawing, and/or the like. Sensor data corresponding to the one or more traced glyphs 224 is received by the processor of the communication device 200. The sensor data is compressed and included in a directive sent to a host device. The directive also includes either the coordinates on the display 210 where the one or more glyphs 224 were traced (if the host device contains a table linking the coordinates of the first portion 220 with an address of the first remote device) or an address of the first remote device (if the communication device 200 includes a table linking the coordinates of the first portion 220 with an address of the first remote device).

The host device receives the directive from the communication device 200 and stores the directive in a memory of the host device associated with the communications session. In some embodiments, the host device sends a notification to the first remote device notifying the first remote device that the directive is waiting to be sent to the first remote device. In such embodiments, the host device can wait to receive a request from the first remote device before sending the directive to the first remote device. In some embodiments, the server stores multiple directives received in a memory producing a queue of directives to be sent to the first remote device when requested by the first remote device. In other embodiments, the host device does not store the directive in non-volatile memory, but merely sends the directive to the first remote device. In yet other embodiments, the communication device sends the directive directly to the first remote device without sending the directive to a host device.

The directive is then sent to the address of the first remote device and received by the first remote device. The processor of the first remote device interprets the directive and causes the one or more glyphs traced within the first portion 220 of the communication device 200 to also be displayed on a display of the first remote device. In some embodiments, the one or more glyphs are preloaded into a memory of the first remote device and the directive causes the processor of the first remote device to load the one or more glyphs from the memory. In other embodiments, the directive contains the information necessary to display the one or more glyphs such that the one or more glyphs do not need to be preloaded into the memory of the first remote device.

In some embodiments, the one or more glyphs are displayed within a portion of the first remote device associated with the communication device 200. In some embodiments, if the first remote device is deactivated (e.g., powered off, without network connectivity), it receives the directive the next time it is activated (e.g., powered on, with network connectivity). In other embodiments, the host device can queue directives received from the communication device and wait for the first remote device to request the that the directives be sent to the first remote device.

Similar to sending one or more glyphs to the first remote device, the communication device 200 can receive one or more glyphs from the first remote device via a communications session. In some embodiments, for example, a user of the first remote device can trace the one or more glyphs in a portion of the first remote device associated with the communication device 200. This causes a processor of the first remote device to receive sensor data corresponding to the one or more traced glyphs and compress the sensor data into a directive sent to the communication device 200 via a communications session. The processor of the communication device 200 interprets the directive such that the one or more glyphs are displayed on the display 210. In some embodiments, the one or more glyphs received from the first remote device are displayed on the display 210 within the first portion 220 of the display 210 since the first portion 220 of the display 210 is associated with the first remote device. In other embodiments, the one or more glyphs received are displayed in another portion of the display such as the third portion of the display and/or a portion of the display screen uniquely associated with displaying glyphs received from the first remote device.

In some embodiments, each time the processor of the communication device 200 receives sensor data representing a glyph that was traced by the user in the first portion 220, a directive containing the sensor data is sent to the first remote device. For example, if the user of the device 220 was tracing "Hello" in the first portion 220 of the display 210, once the user traces the first vertical line of the "H", a first directive having a representation of a glyph of the vertical line would be sent to the first remote device. Accordingly, the first remote device can display the glyphs in an order in which they were traced and with a delay between the glyphs similar to the time between the user tracing the glyphs on the display 210 of the communication device 200. Additionally, in some embodiments, the first remote device can display the glyphs in as close to real-time as possible. Said another way, as the user of the device 220 traces the glyphs in the first portion 220 of the display 210, the device 200 sends a directive associated with each glyph traced as soon as the glyph is traced. The first remote device displays the glyphs being traced as the directives are received. In such embodiments, there is minimal delay between the time the glyphs are traced on the display 210 of the device 200 and the time the glyphs are displayed on the display of the first remote device. For example, the delay is the time it takes to send the directives from the device 200 to the first remote device.

In other embodiments, to send a directive to the first remote device, a user of the device does not trace the glyphs in the portion of the display associated with the first remote device, but instead traces the glyphs in the third portion of the display and then indicates to send the glyphs to the first remote device. For example, the user of the device can trace the glyphs in the third portion of the display and then touch the first portion of the display to indicate to send a directive associated with the glyphs to the first remote device. Similarly, the user of the device can trace the glyphs in the third portion of the display and then trace a path on the display toward the first portion of the display.

Once the communication device 200 is finished interacting with the first remote device, the communications session between the communication device 200 and the first remote device can be closed. In some embodiments, for example, the communications session is closed when the host device receives a directive associated with closing the communications session and/or a communications session close signal. The directive can be sent to the host device in response to sensor data produced by a user and received by the processor of the communication device 200. In some embodiments, such sensor data can be produced when a user selects a portion of the display 210 associated with closing the communications session, such as, for example, a "close" button.

The second portion 230 of the display 210 can be defined and associated with the second remote device similar to the first portion 220 of the display 210 being defined and associated with the first remote device. Accordingly, glyphs can be sent to and received from the second remote device in a similar manner as sending glyphs to and receiving glyphs from the first remote device.

Figure 3:
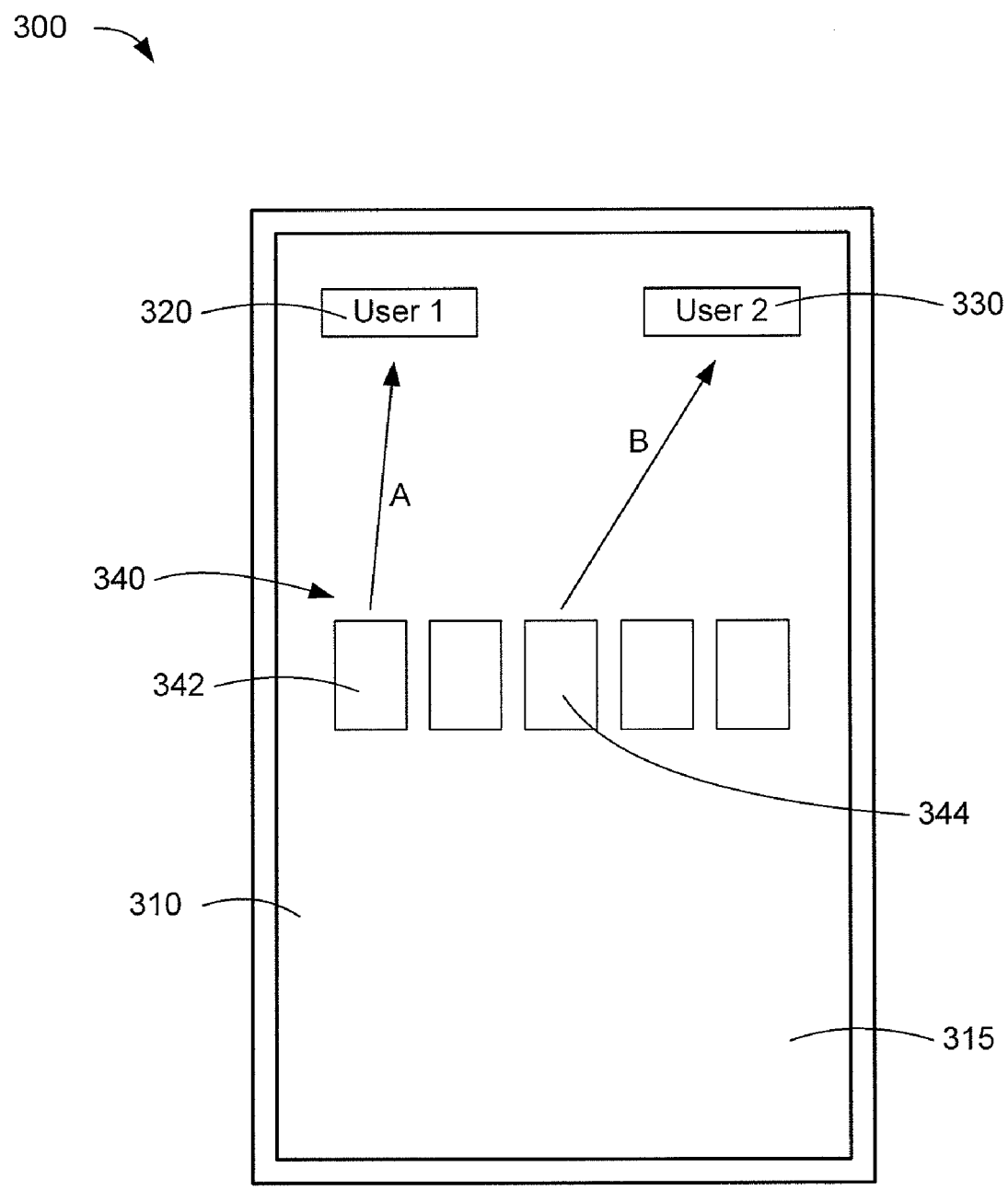

While shown and described in FIG. 2 as sending and/or receiving a directive associated with one or more glyphs, a directive associated with any symbol can be sent to and or received from a remote device using a portion of a display associated with the remote device. For example, FIG. 3 shows a schematic illustration of a display 310 of a communication device 300 displaying symbols 340 that can be associated with a directive sent to and/or received from a remote device, according to another embodiment.

The communication device 300 includes a processor (not shown) and a memory (not shown) and can be substantially similar to the communication devices 180 shown and described in relation to FIG. 1A. The display 310 of the communication device 300 can be a touch-sensitive display structurally and functionally similar to the displays 156, 166 shown and described in FIG. 1A.

The display 310 includes a first portion 320, a second portion 330 and a third portion 315. The first portion 320 of the display 310 is uniquely associated with a first remote device (not shown) such that when a user-selected indicator associated with the first portion 320 of the display 310 is received by the processor of the communication device 300, a directive is sent to the first remote device via a communications session. For example, in the embodiment shown in FIG. 3, and as further described herein, a directive containing content representing one or more symbols 340 can be sent to the first remote device when the user of the communication device 300 selects one or more symbols 340 and traces a path to or in the direction of the first portion 320 of the display 310.

In such embodiments, the directive sent to the first remote device can be stored in a memory of a host device and can instruct a processor of the first remote device to display the one or more symbols on a display of the first remote device. Similarly, the second portion 330 of the display 310 is uniquely associated with a second remote device (not shown) such that when a user-selected indicator associated with the second portion 330 is received by the processor, a directive is sent to the second remote device. In some embodiments, meta-data about the first portion 320 of the display 310, the second portion 330 of the display 310, the first remote device, and/or the second remote device is stored in the memory of the communication device 300. The first portion 320 of the display 310 can be mutually exclusive of the second portion 330 of the display 310.

In some embodiments, the first portion 320 of the display 310 and/or the second portion 330 of the display 310 can include a device identifier uniquely identifying the first portion 320 as being associated with the first remote device and/or the second portion 330 as being associated with the second remote device, respectively.

The third portion 315 of the display 310 is not associated with another device. Accordingly, the third portion 315 of the display 310 can be used to perform tasks local to the communication device 300 and/or tasks not associated with the first remote device or the second remote device.

Multiple symbols 340 are displayed on the third portion 315 of the display 310. In some embodiments, for example, the symbols 340 are images representing playing cards. In other embodiments, the symbols can be glyphs, images, videos and/or the like representing anything displayed on the third portion of the display. A user of the communication device 300 can send a directive associated with one or more of the symbols 340 to the first remote device or the second remote device by selecting one or more of the symbols 340 and tracing a path on the display 310 to or in the direction of the first portion 320 of the display 310 or the second portion 330 of the display, respectively, as further described herein.

In use, the first portion 320 of the display 310 and the second portion 330 of the display 310 are defined and associated with the first remote device and the second remote device, respectively, similar to the first portion 220 of the display 210 being defined and associated with the first remote device, shown and described in relation to FIG. 2. As such, in one embodiment, a user defines the first portion 320 of the display 310 and/or the second portion 330 of the display 310. In other embodiments, a host device defines the first portion of the display and/or the second portion of the display.

In some embodiments, before the first portion 320 of the display 310 is associated with the first remote device, the first remote device receives an indication that the communication device 300 is attempting to initiate a communications session with the first remote device. Once a user of the first remote device authorizes the initiation of the communications session, then the first portion 320 of the display screen 310 can be associated with the first remote device.

Once the first portion 320 of the display 310 is associated with the first remote device via a communications session, the communication device 300 can send directives to the first remote device. For example, as shown in FIG. 3, a user of the communication device 300 can send a directive associated with a first symbol 342 (e.g., a playing card) to the first remote device. In some embodiments, the directive associated with the first symbol 342 can be sent to the first remote device when a portion of the first symbol 342 is within the first portion 320 of the display 310. In such embodiments, the user can move the first symbol 342 on the display to the first portion 320 of the display by selecting the first symbol 342 (e.g., touching the first symbol 342 with a finger) and then tracing a path A to the first portion 320 of the display 310. The processor of the communication device 300 receives sensor data from the user touching the display indicating that the first symbol 342 was selected and that the user is tracing the path A. The processor causes the first symbol 342 to be displayed as moving on the display 310 along the path A. Once a portion of the first symbol 342 is displayed within the first portion 320 of the display 310, the processor sends a directive associated with the first symbol 342 to the first remote device, via a host device and/or a communications session hosted by the host device, as described above.

In other embodiments, a directive associated with the first symbol can be sent to the first remote device when the processor receives sensor data indicating a user-selected the first symbol and traced a path in a direction toward the first portion of the display. In such embodiments, the processor of the communication device recognizes the direction of the path toward the first portion of the display and the user need not trace the entire path to the first portion of the display. As long as the user begins to trace a path in the direction of the first portion of the screen, the processor will recognize this and send a directive associated with the first symbol to the first remote device.

In still other embodiments, a directive associated with the first symbol is sent to the first remote device when the processor receives sensor data indicating a user-selected the first symbol (e.g., touched the portion of the display displaying the first symbol) and then selected the first portion of the display (e.g., touched the first portion of the display). In such an embodiment, no path need be traced between the first symbol and the first portion of the display. In yet other embodiments, any other method of indicating that a directive associated with the first symbol is to be sent to the first remote device can be used.

Once the processor of the communication device 300 sends the directive to a host device, the host device receives and stores the directive in a memory of the host device associated with the communications session. In some embodiments, the host device sends a notification to the first remote device notifying the first remote device that the directive is waiting to be sent to the first remote device. In such embodiments, the host device can wait to receive a request from the first remote device before sending the directive to the first remote device. In some embodiments, the server stores multiple directives received in a memory producing a queue of directives to be sent to the first remote device when requested by the first remote device. In other embodiments, the host device does not store the directive in non-volatile memory, but merely sends the directive to the first remote device.

The directive is then sent to the address of the first remote device and is received by the first remote device. The processor of the first remote device interprets the directive and causes the symbol to be displayed on the first remote device. In some embodiments, the symbol is preloaded into a memory of the first remote device and the directive causes the processor of the first remote device to load the symbol from the memory. In other embodiments, the directive contains the information necessary to display the symbol such that the symbol does not need to be preloaded into the memory of the first remote device.

In some embodiments, the symbol is also displayed within a portion of the first remote device associated with the communication device 300. In some embodiments, the symbol can be displayed on a display of the first remote device differently than it is displayed on the display 310 of the communication device 300. In such embodiments, for example, a playing card might appear to be face up on the first remote device, but face down on the communication device 300. In some embodiments, if the first remote device is deactivated (e.g., powered off, without network connectivity), it receives the directive the next time it is activated (e.g., powered on, with network connectivity). In other embodiments, the host device can queue directives received from the communication device and wait for the first remote device to request the that the directives be sent to the first remote device.

Similar to the first symbol 342, a second symbol 344 can be sent to the second remote device. In some embodiments, the directive associated with the second symbol 344 can be sent to the second remote device when a portion of the second symbol 344 is within the second portion 330 of the display 310. In such embodiments, the user can move the second symbol 344 on the display to the second portion 330 of the display by selecting the second symbol 344 (e.g., touching the second symbol 344 with a finger) and then tracing a path B to the second portion 330 of the display 310. In other embodiments, a directive associated with the second symbol can be sent to the second remote device when the processor receives sensor data indicating a user-selected the second symbol and traced a path in a direction toward the second portion of the display. In still other embodiments, a directive associated with the second symbol is sent to the second remote device when the processor receives sensor data indicating a user-selected the second symbol and then selected the second portion of the display. In yet other embodiments, any other method of indicating that a directive associated with the second symbol is to be sent to the second remote device can be used.

Once the processor of the communication device 300 sends the directive to a host device, the host device receives and stores the directive in a memory of the host device. The directive is then sent to the second remote device. The processor of the second remote device interprets the directive and causes the symbol to be displayed on the second remote device.

Similar to sending a directive associated with a symbol to the first remote device or the second remote device, the communication device 300 can receive one or more directives associated with symbols from the first remote device or the second remote device. In some embodiments, for example, a user of the first remote device can indicate that a directive associated with a symbol displayed on the display of the first remote device is to be sent to the communication device 300. This can be done by any suitable method such as those described above. The directive associated with the symbol is then sent from the first remote device to the communication device 300 via a host device and/or a communications session hosted by the host device. The processor of the communication device 300 interprets the directive such that the symbol is displayed on the display 310.

Figure 4:
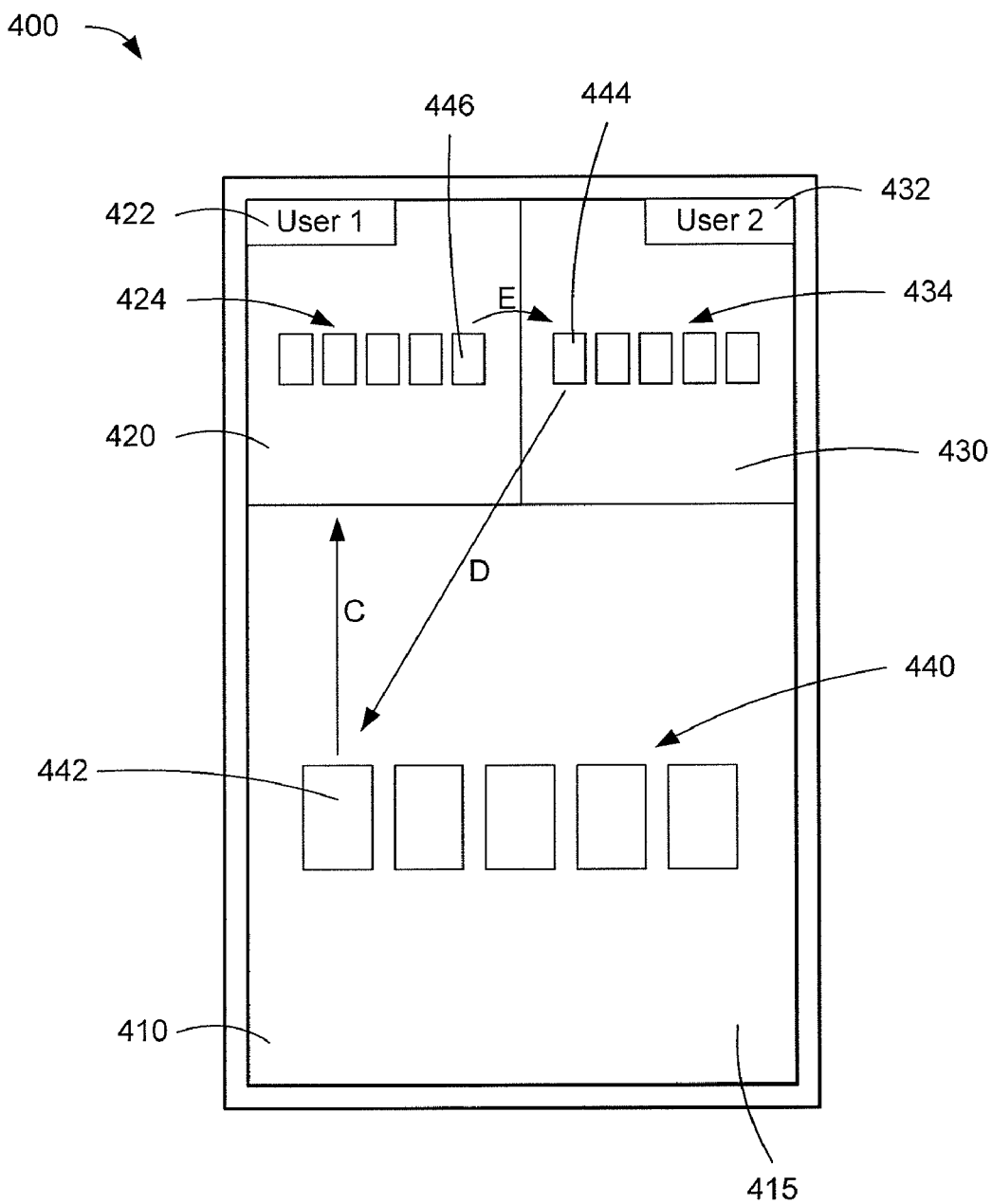

FIG. 4 illustrates an example of partitioning a display 410 of a communication device 400 to play a card game. The communication device 400 includes a first portion 420 of the display 410, a second portion 430 of the display 410 and a third portion 415 of the display 410. The first portion 420 of the display 410 and the second portion 430 of the display 410 are associated with a first remote device and a second remote device, respectively. As such, the communication device 400 can send directives associated with symbols to and receive directives associated with symbols from the first remote device and the second remote device. In some embodiments, the first portion 420 of the display 410 and the second portion 430 of the display 410 include device identifiers 422 and 432, respectively.

The first portion 420 of the display 410 displays symbols 424 representing multiple playing cards. Similarly, the second portion 430 of the display 410 displays symbols 434 representing multiple playing cards. These symbols represent the cards of a user of the first remote device and a user of the second remote device, respectively. A user of the communication device 400 is unable to perform actions within the first portion 420 of the display 410 or the second portion 430 of the display 410, but can observe actions initiated by the user of the first remote device and by the user of the second remote device, respectively. In some embodiments, for example, the user of the communication device 400 can observe the user of the first remote device or the user of the second remote device rearrange their cards, exchange cards, turn cards over, and/or the like.

The third portion 415 of the display 410 includes multiple symbols 440 representing playing cards. The symbols 440 represent the cards of a user of the communication device 400 in a card game. Within the third portion 415 of the display 410 the user of the communication device 400 can perform various actions on the symbols. In some embodiments, for example, the user of the communication device 400 can rearrange the playing cards, exchange playing cards with the other users (described in further detail below), turn cards over so a face of the card is visible only to that user or to all users, and/or the like.

The user of the communication device 400 can send a directive associated with a first symbol 442 representing a first playing card to the user of the first remote device by indicating that a directive associated with the first symbol 442 is to be sent to the first remote device. A user can indicate that a directive associated with the first symbol 442 is to be sent to the first remote device using any of the methods described above with respect to FIG. 3. In some embodiments, for example, the directive is sent when the user selects the first symbol 442 and traces a path C to the first portion 420 of the display 410 such that the first symbol 442 is shown as being moved along the path C and at least a portion of the first symbol is displayed within the first portion 420 of the display 410. In other embodiments, the directive can be sent after a user selects the first symbol and traces a path in the direction of the first portion of the display. In still other embodiments, the directive can be sent when the user selects the first symbol and then selects the first portion of the display.

When the directive associated with the first symbol 442 is sent to the first remote device, in some embodiments, the user of the communication device 400 can view the first symbol 442 moving along the path C and into the playing cards 424 of the user of the first remote device. An image resource, video, movement of a single image, and/or the like can be used to produce such animation. The image resource can include, for example, a set of images and/or information associated with a set of images. In some embodiments, such information can include, for example, orientation information, a map of neighbor relationships, and/or the like. In some embodiments, for example, the image resource can be similar to the image resources shown and described in co-pending U.S. patent application Ser. No. 12/480,437, filed on Jun. 8, 2009, and entitled "METHODS AND APPARATUS FOR SELECTING AND/OR DISPLAYING IMAGES OF PERSPECTIVE VIEWS OF AN OBJECT AT A COMMUNICATION DEVICE," and co-pending U.S. patent application Ser. No. 12/480,432, filed on Jun. 8, 2009, and entitled "METHODS AND APPARATUS FOR PROCESSING RELATED IMAGES OF AN OBJECT BASED ON DIRECTIVES," each of which is incorporated herein by reference in its entirety.

Similar to sending a directive associated with a symbol to the first remote device or the second remote device, the communication device 400 can receive one or more directives associated with symbols from the first remote device or the second remote device via a communications session. In some embodiments, for example, the user of the communication device 400 can receive a directive associated with a symbol 444 representing a playing card from the user of the second remote device. For example, a user of the second remote device can indicate that a directive associated with the symbol 444 is to be sent to the communication device 400. This can be done by any suitable method such as those described above. The directive associated with the symbol 444 is then sent from the second remote device to the communication device 400. The processor of the communication device 400 interprets the directive such that the symbol 444 is displayed on the third portion 415 of the display 410. In some embodiments, the processor of the communication device 400 causes the symbol 444 to be displayed on the display 410 as moving from the second portion 430 of the display 410 to the third portion 415 of the display 410 along, for example, a path D.

In some embodiments, the first remote device can send and receive directives associated with symbols from the second remote device. In such embodiments, the communication device 400 receives a directive that instructs the processor of the communication device 400 to display the exchange of cards on the display 410. For example, the user of the first remote device can send a directive associated with a symbol 446 representing a card to the user of the second remote device. A directive indicating that the first remote device sent the second remote device a directive associated with the symbol 446 is received by the communication device 400. The processor of the communication device 400 interprets the directive and displays the symbol 446 as moving from the first portion 420 of the display 420 to the second portion 430 of the display along, for example, a path E. Accordingly, while the user of the communication device 400 does not actively perform actions within the first portion 420 or the second portion 430, the user can view activity within the first portion 420 and the second portion 430.

Figure 5:
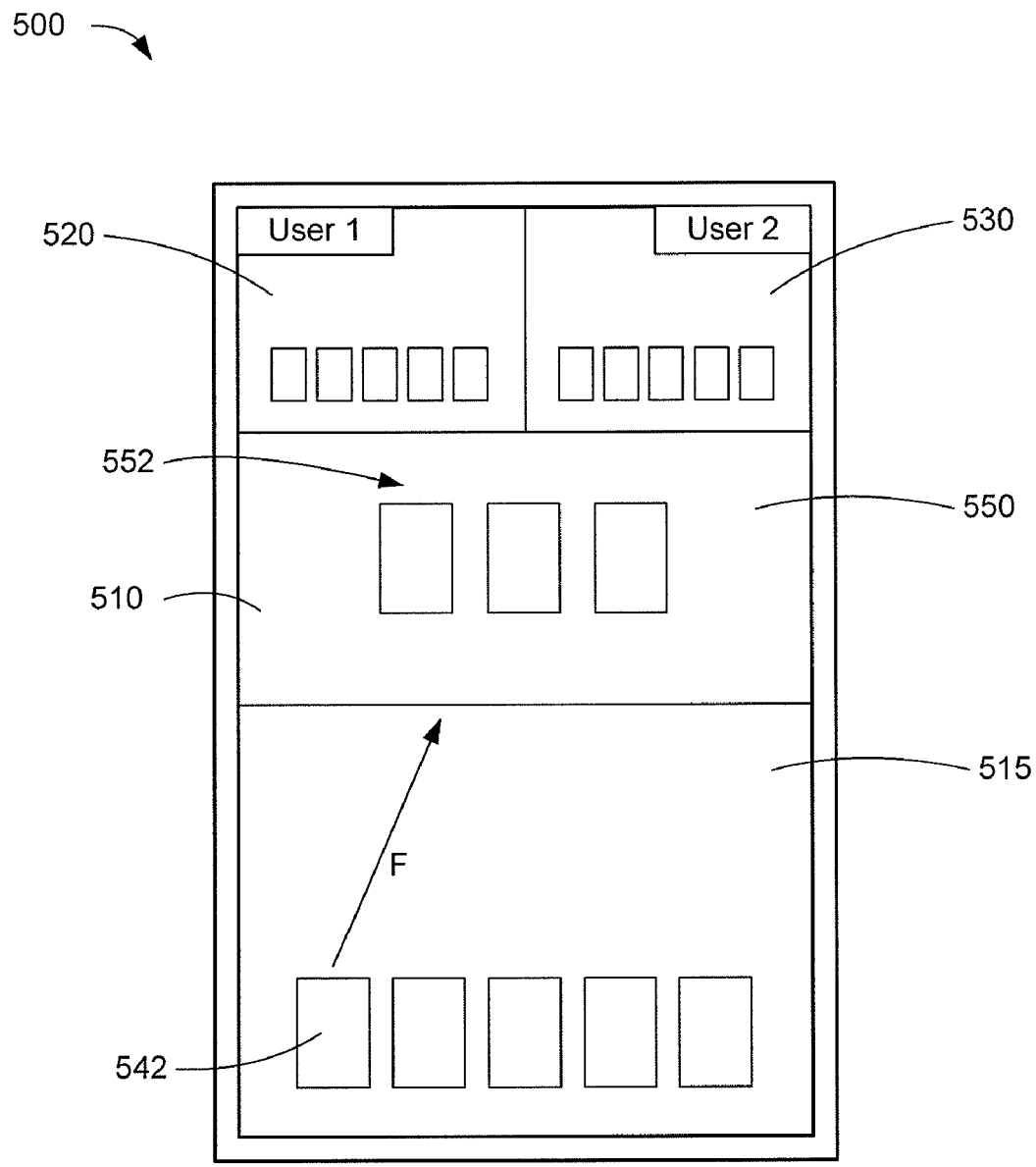

FIG. 5 is a schematic illustration of a display 510 of a communication device 500, according to another embodiment. The display 510 of the communication device 500 is similar to the display 410 and includes a first portion 520, a second portion 530 and a third portion 515. The display 510 also includes a fourth portion 550. In some embodiments, the fourth portion 550 is a common portion that is shared among the first remote device, the second remote device and the communication device 500. In such embodiments, for example, the fourth portion 550 of the display 510 can be a portion of a card game common to the game. For example, the fourth portion 550 of the display 510 can display symbols representing a draw pile, a discard pile, community cards, and/or the like.

The fourth portion 550 of the display 510 can be updated by a communications session at a host device. As such, the communication device 500 can send directives associated with symbols to the host device. In response to a directive, the host device can send a directive to the communication device 500 (and the first remote device and the second remote device) to cause the processor of the communication device 500 to update the fourth portion 550 of the display 510 in response to the directive.

The user of the communication device 500 can cause the communication device 500 to send a directive associated with a first symbol 542 representing a first playing card to the host device to update the fourth portion 550 of the display 510 by indicating that a directive associated with the first symbol 542 is to be sent to the host device to update the fourth 550 of the display 510. A user can indicate that a directive associated with the first symbol 542 is to be sent to the host device to update the display using any of the methods described above with respect to FIG. 3. In some embodiments, for example, the directive is sent when the user selects the first symbol 542 (e.g., touches the display 510 at the portion where the first symbol 542 is displayed) and traces a path F to the fourth portion 550 of the display 510 such that the first symbol 542 is shown as being moved along the path F and at least a portion of the first symbol is displayed within the fourth portion 550 of the display 510. In other embodiments, the directive can be sent after a user selects the first symbol and traces a path in the direction of the fourth portion of the display. In still other embodiments, the directive can be sent when the user selects the first symbol and then selects the fourth portion of the display.

The host device then sends a directive to the communication device 500 associated with the first symbol 542. The processor of the communication device 500 causes the first symbol 542 to be displayed on the fourth portion 550 of the display 510. Similarly, the host device can send directives to the first remote device and the second remote device to instruct the processors of the first remote device and the second remote device to display the first symbol 542 within a portion of a display of the first remote device and a display of the second remote device associated with the common area.

While described above as not allowing a user to perform actions in the fourth portion 550, in other embodiments, the user can perform actions in the fourth portion of the display at certain times. For example, during a card game, the user of the communication device might be able to provide an indication within the fourth portion that they wish to draw a card from a pile, discard a card to a pile, and/or the like during their turn but not when it is another player's turn. Similarly, the other players in the card game (e.g., a user of the first remote device and a user of the second remote device) would be able to perform similar actions in a common area on the displays of the first remote device and the second remote device, respectively, when it is their turn. In some embodiments, such actions performed in the fourth portion are controlled by the host device. Said another way, when the user of the communication device provides an indication in the fourth portion of the display, the communication device sends a directive to the host device, indicating the user-produced indication. The host device can then update the displays of all players in the card game by sending directives to their respective devices.

Figure 6:
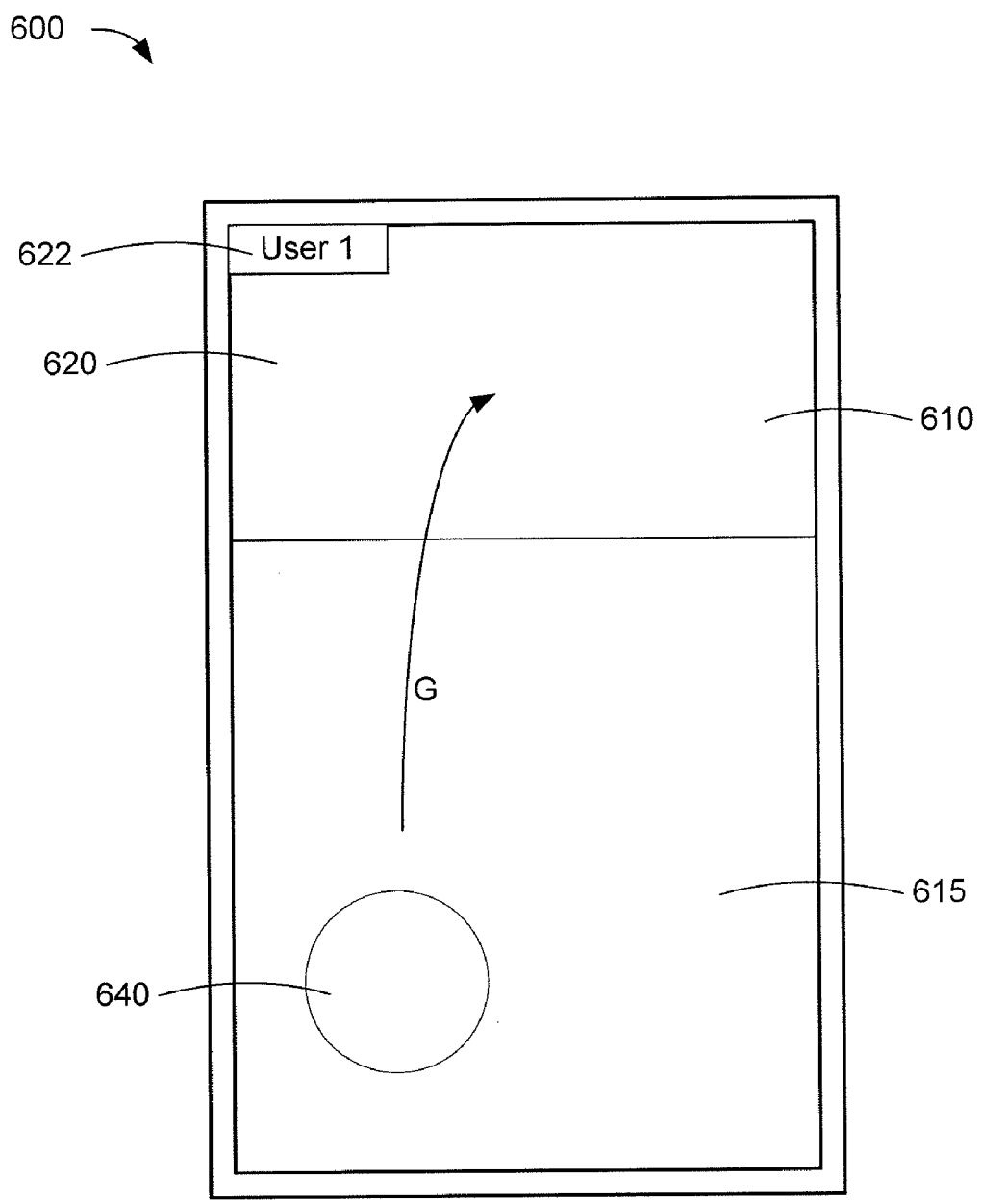
FIGS. 6-7 are schematic illustrations of a display of a first communication device and a display of a second communication device, respectively, according to another embodiment.
Figure 7:
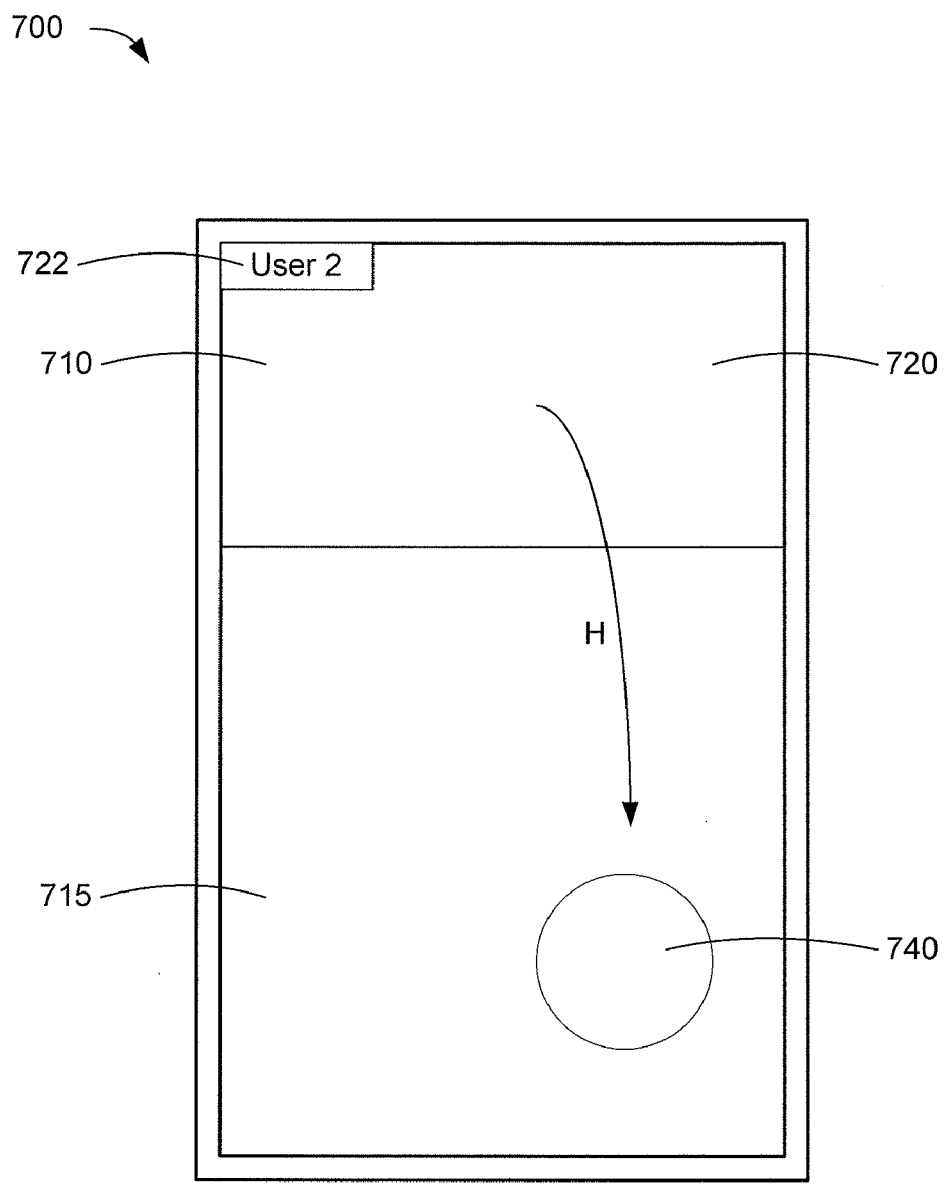

FIGS. 6-7 are schematic illustrations of a display 610 of a first communication device 600 and a display 710 of a second communication device 700, respectively, according to another embodiment. The first communication device 600 and the second communication device 700 include processors (not shown) and memories (not shown) and can be substantially similar to communication devices 180 shown and described in relation to FIG. 1A. The display 610 of the first communication device 600 and the display 710 of the communication device 700 can be touch-sensitive displays structurally and functionally similar to the displays 156, 166 shown and described in FIG. 1A.

The display 610 of the first communication device 600 includes a first portion 620 and a second portion 615. The first portion 620 of the display 610 of the first communication device 600 is uniquely associated with the second communication device 700 (FIG. 7) such that when a user-selected indicator associated with the first portion 620 of the display 610 is received by a processor of the first communication device 600, a directive is sent to the second communication device 700, as described in further detail herein. In some embodiments, the first portion 620 of the display 610 can include a device identifier 622 uniquely identifying the first portion 620 as being associated with the second communication device 700.

The second portion 615 of the display 610 is not associated with another device. Accordingly, the second portion 615 of the display 610 can be used to perform tasks local to the communication device 600 and/or tasks not associated with second communication device 700. In some embodiments, directives associated with symbols displayed in the second portion 615 of the display 610 can be sent to the second communication device 700 when the user provides an indication associated with the first portion 620 of the display 610.

Similarly, the display 710 of the second communication device 700 includes a first portion 720 and a second portion 715. The first portion 720 of the display 710 of the second communication device 700 is uniquely associated with the first communication device 600 (FIG. 6) such that when a user-selected indicator associated with the first portion 720 of the display 710 is received by a processor of the second communication device 700, a directive is sent to the first communication device 600 via a communications session, as further described herein. In some embodiments, the first portion 720 of the display 710 can include a device identifier 722 uniquely identifying the first portion 720 as being associated with the first communication device 600.

The second portion 715 of the display 710 is not associated with another device. Accordingly, the second portion 715 of the display 710 can be used to perform tasks local to the communication device 700 and/or tasks not associated with the first communication device 600. In some embodiments, directives associated with symbols displayed in the second portion 715 of the display 710 can be sent to the first communication device 600 when the user provides an indication associated with the first portion 720 of the display 710.

In use, the first portion 620 of the display 610 of the first communication device 600 is associated with the second communication device 700 by any suitable method, such as those described above. The first portion 720 of the display 710 of the second communication device 700 is similarly associated with the first communication device 700.

Once the first portion 620 of the display 610 is associated with the second communication device 700 via a communications session, the first communication device 600 can send directives to the second communication device 700. In some embodiments, for example, a directive associated with a symbol 640 displayed in the second portion 615 of the display 610 can be sent to the second communication device 700 when the processor of the first communication device 600 receives sensor data indicating that the directive associated with the symbol 640 should be sent to the second communication device 700.

In some embodiments, the directive associated with the symbol 640 can be sent to the second communication device 700 when a portion of the first symbol 640 is within the first portion 620 of the display 610. In such embodiments, the user can move the symbol 640 on the display to the first portion 620 of the display by selecting the symbol 640 (e.g., touching the symbol 640 with a finger) and then tracing a path G to the first portion 620 of the display 610. The processor of the communication device 600 receives sensor data from the user touching the display indicating that the first symbol 640 was selected and that the user is tracing the path G. As the user traces the path G, the processor of the communication device 600 receives the sensor data from the user tracing the path G and causes the first symbol 640 to be displayed as moving on the display 610 along the path G. Once a portion of the first symbol 640 is displayed within the first portion 620 of the display, the processor of the first communication device 600 sends a directive associated with the first symbol 640 to the second communication device 700, via a host device and/or a communications session hosted by the host device, as described above.

In other embodiments, a directive associated with the symbol can be sent to the second communication device when the processor of the first communication device receives sensor data indicating a user-selected the symbol and traced a path in a direction toward the first portion of the display. In such embodiments, the processor of the first device recognizes the direction of the trace toward the first portion of the display and the user need not trace the entire path to the first portion of the display. As long as the user begins to trace a path in the direction of the first portion of the screen, the processor will recognize this and send a directive associated with the first symbol to the second communication device.

In still other embodiments, a directive associated with the symbol is sent to the second communication device when the processor of the first communication device receives sensor data indicating a user-selected the symbol and then selected the first portion of the display of the first device. In such an embodiment, no path need be traced between the symbol and the first portion of the display. In yet other embodiments, any other method of indicating that a directive associated with the symbol is to be sent to the second communication device can be used.

In some embodiments, the directive can include a behavior profile of the symbol 640. The behavior profile can include various characteristics of the symbol 640. For example, the behavior profile can include motion data derived from sensor data. The motion data can include a path of the symbol 640, a speed of the symbol 640, an acceleration of the symbol 640, and/or the like. The motion data is derived from the sensor data received by the processor as the user of the first communication device 600 traces the path G. Other characteristics within the behavior profile can include characteristics about an object that the symbol 640 represents. In some embodiments, for example, the symbol 640 can be a bouncy ball. The behavior profile of the bouncy ball can include a high elastic characteristic such that when the symbol 640 contacts a side portion of the display 610, it will appear to bounce. In other embodiments, the symbol can be a hackie sack. In contrast to the bouncy ball, the behavior profile of the hackie sack can include a low elastic characteristic such that when the symbol contacts a side portion of the display, it will not bounce. In yet other embodiments, the behavior profile can include aerodynamic properties, rotational properties, a weight of an object and/or any other properties or characteristics of the object that the symbol represents. For example, a symbol such as a image resource of an airplane (e.g., a collection of images defining the airplane) can have properties that make it perform loops, dive, and/or the like.

Once the processor of the first communication device 600 sends the directive to the host device, the host device receives and stores the directive in a memory of the host device. The directive is then sent to the address of the second communication device 700. In other embodiments, the host device does not store the directive in non-volatile memory, but merely sends the directive to the second communication device 700.

The directive is received by the second communication device 700. The processor of the second communication device 700 interprets the directive and causes a symbol 740 substantially similar to the symbol 640 to be displayed on the display 710 of the second communication device 700 (FIG. 7). In some embodiments, the symbol 740 is displayed within the first portion 710 of the second communication device 700 since the first portion 710 of the second communication device 700 is associated with the communication device 600. In some embodiments, the symbol 740 can appear as coming from the first portion 710 of the second communication device 700 (e.g., the symbol can change sizes from small to large to provide the appearance of movement toward the user of the second communication device 700).

In some embodiments, the processor of the second communication device 700 interprets the behavior profile associated with the symbol 640 contained within the directive and causes the symbol 740 to be displayed on the display 710 of the second communication device 700 in accordance with the behavior profile. For example, the symbol 740 can be displayed on the display 710 of the second communication device 700 as moving in a similar path H, with a similar speed, and/or with a similar acceleration as the trace on the display 610 of the first communication device 600 traced by the user of the first communication device 600 to send the first directive. Additionally, the symbol 740 can be displayed and act in accordance with any other characteristics contained within the behavior profile.

Figure 8:
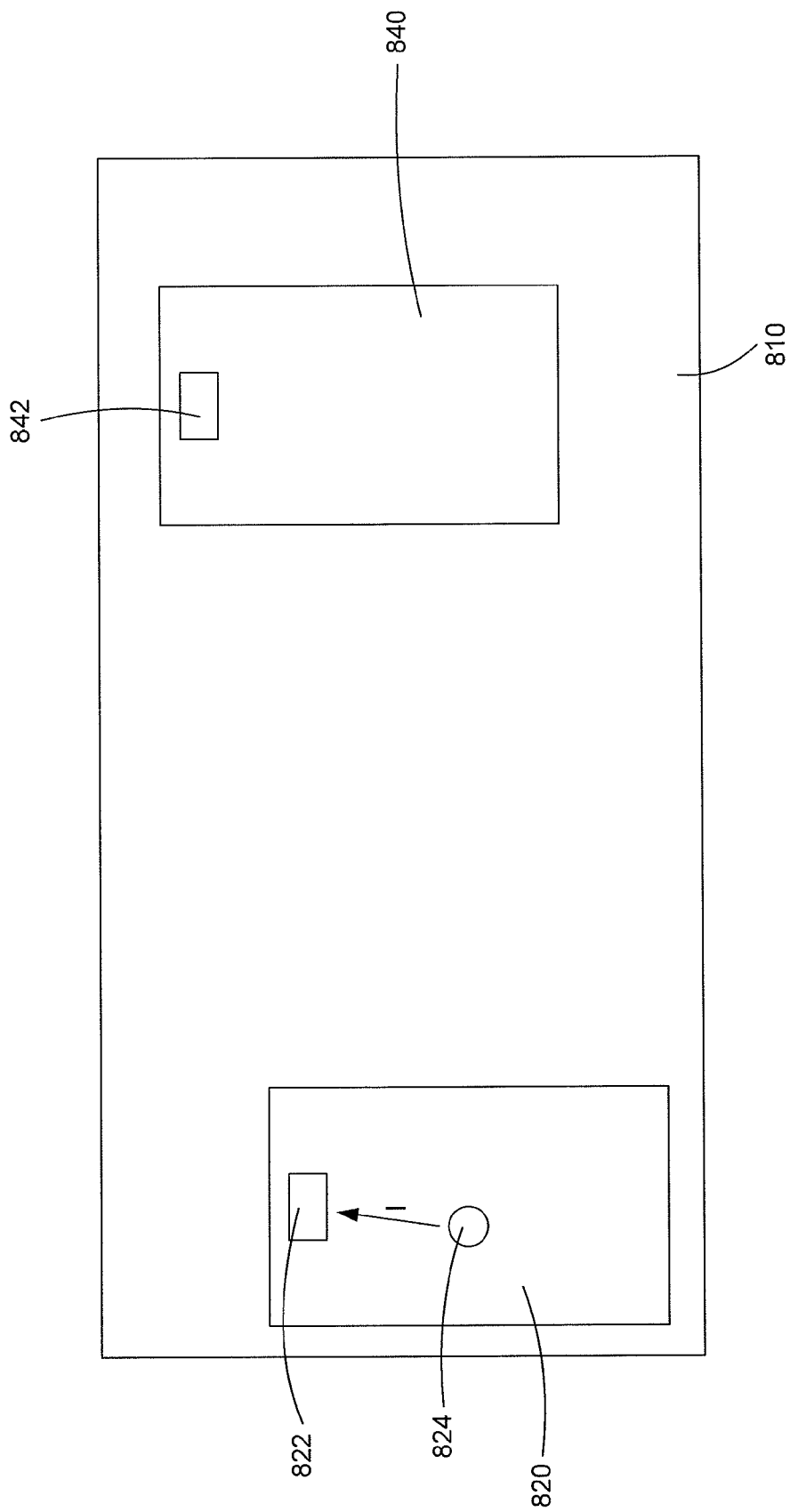
FIGS. 8-9 are schematic illustrations of a canvas a portion of which can be displayed on multiple communication devices, according to another embodiment.
Figure 9:
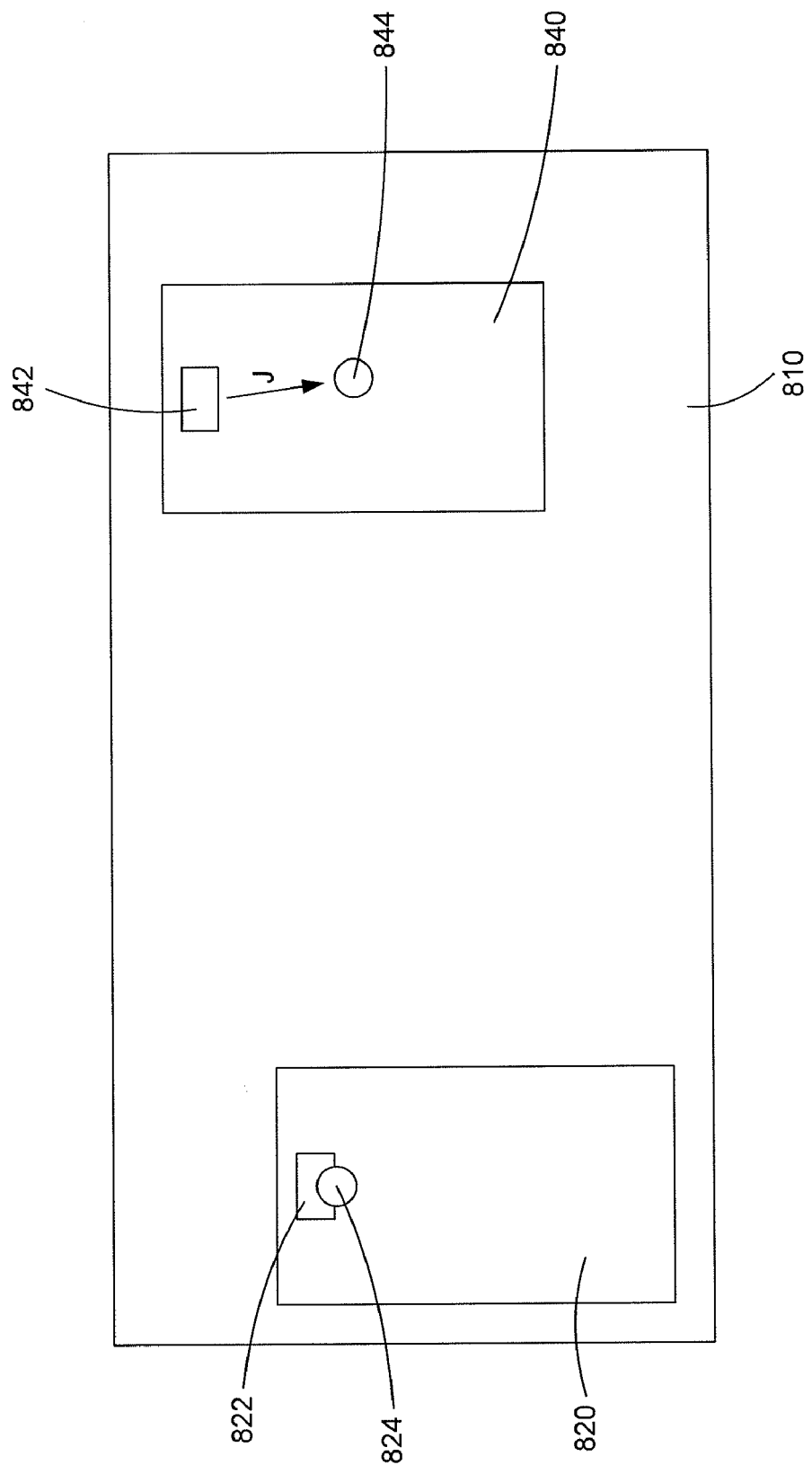

FIGS. 8-9 are schematic illustrations of a canvas 810 having a first portion 820 and a second portion 840. The first portion 820 of the canvas 810 is displayed on a first communication device (not shown in FIGS. 8-9). Similarly, the second portion 840 of the canvas 810 is displayed on a second communication device (not shown in FIGS. 8-9). The first communication device and the second communication device can be substantially similar to the communication devices 180, shown and described above. In some embodiments, the first portion 820 of the canvas 810 is mutually exclusive from the second portion 840 of the canvas 810. In other embodiments, the first portion of the canvas and the second portion of the canvas can include a common portion.

In some embodiments, a canvas can be related to a communications session. In other words, the directives distributed within a communications session can be relative to a canvas. A canvas can be a virtual workspace, a desktop and/or a background represented in a memory. In some embodiments, a canvas can be represented across multiple devices. For example, the first portion 820 of the canvas 810 is displayed on the first communication device and the second portion 840 of the canvas 810 is displayed on the second communication device. In other words, various portions of the canvas can be represented within memories of various communication devices and/or a communications session controller. In some embodiments, the canvas 810 includes access properties that can indicate which users and/or devices can access which portions of the canvas. For example, a first user might be authorized to access the first portion 820 of the canvas 810 but not the second portion 830 of the canvas 810.

In some embodiments, a user authorized to access the entire canvas 810 (including the first portion 820 and the second portion 830) can move and/or rearrange symbols on the canvas 810 irrespective of the different portions 820, 830 of the canvas 810 and/or user permissions. Accordingly, such a user can monitor the canvas 810 and freely move symbols between devices. In other embodiments, a processor (e.g., at the host device) is configured to monitor the canvas. In such embodiments, the processor can move symbols between devices and/or portions of the canvas irrespective of the different portions of the canvas and/or user permissions.

In some embodiments, the canvas 810 has display properties that indicate how the canvas is to be displayed on the first communication device and/or the second communication device. In some embodiments, the canvas has size properties indicating dimensions of the canvas (e.g., height, width, depth, etc.).

The canvas 810 can define a coordinate system or space. In some embodiments, for example, the coordinate system can be absolute such that a symbol displayed in the first portion 820 of the canvas 810 has the same coordinates to the first device and the second device. In other embodiments, the coordinate system is relative to the devices viewing the canvas. Using a single canvas displayed across multiple devices can be used in product development applications and/or any application where multiple users are working on multiple portions of a project.

In some embodiments, the first portion 820 of the canvas 810 is associated with a first user such that the first user can view and edit symbols displayed on the first portion 820 of the canvas 810 but the second user cannot. In such embodiments, the second portion 840 is similarly associated with the second portion 840 of the canvas 810. In other embodiments, both the first user and the second user can view and/or edit the first portion of the canvas and/or the second portion of the canvas.

In some embodiments, the portion of the canvas 810 displayed on the first communication device can be changed. In some embodiments, for example, a user of the first communication device can zoom in, zoom out, and/or scroll to another portion of the canvas such that another portion of the canvas 810 is displayed on the first communication device.

The first portion 820 of the canvas 810 includes a section 822 uniquely associated with the second portion 840 of the canvas 810 such that when a user-selected indicator associated with the section 822 of the first portion 820 is received by a processor of the first communication device, a directive is sent to second communication device. Similarly, the second portion 840 of the canvas 810 includes a section 842 uniquely associated with the first portion 820 of the canvas 810 such that when a user-selected indicator associated with the section 842 of the second portion 840 is received by a processor of the second communication device, a directive is sent to first communication device. While described above as being part of the canvas 810, in other embodiments, the section uniquely associated with the second portion and the section uniquely associated with the first portion are sections on a display of the first communication device and the second communication device, respectively.

In use, a directive associated with a symbol 824 displayed on the first portion 820 of the canvas 810 can be sent to the second communication device causing a symbol 844 substantially similar to the symbol 824 to be displayed on the second portion 840 of the canvas.

In some embodiments, the directive associated with the symbol 824 can be sent to the second communication device when a portion of the symbol 824 is within the section 822 of the first portion 820 of the canvas. In such embodiments, the user can move the symbol 824 on the display of the first communication device to the section 822 of the first portion 820 of the canvas by selecting the symbol 824 (e.g., touching the portion of the display displaying the symbol 824 with a finger) and then tracing a path I to the section 822 of the first portion 820. The processor of the first communication device receives sensor data from the user touching the display indicating that the symbol 824 was selected and that the user is tracing the path I. As the user traces the path I, the processor receives the sensor data from the user tracing the path I and causes the symbol 824 to be displayed as moving on the display of the first communication device along the path I. Once a portion of the symbol 824 is displayed within the section 822 of the first portion 820 (FIG. 9), the processor of the first communication device sends a directive associated with the symbol 824 to the second communication device, via a host device and/or a communications session hosted by the host device, as described above.

In other embodiments, a directive associated with the symbol can be sent to the second communication device when the processor of the first communication device receives sensor data indicating a user-selected the symbol and traced a path in a direction toward the section of the first portion of the canvas. In such embodiments, the processor of the first communication device recognizes the direction of the trace toward the section of the first portion of the canvas and the user need not trace the entire path to the section of the first portion of the canvas displayed on the display. As long as the user begins to trace a path in the direction of the section of the first portion, the processor of the first device will send a directive associated with the symbol to the second communication device.

In still other embodiments, a directive associated with the symbol is sent to the second communication device when the processor receives sensor data indicating a user-selected the symbol and then selected the section of the first portion of the canvas displayed on the display. In such embodiments, no path need be traced between the symbol and the section of the first portion. In yet other embodiments, any other method of indicating that a directive associated with the symbol is to be sent to the second communication device can be used.

Once the processor of the first communication device sends the directive to a host device, the host device receives and stores the directive in a memory of the host device. In some embodiments, the host device sends a notification to the second communication device notifying the second communication device that the directive is waiting to be sent to the second communication device. In such embodiments, the host device can wait to receive a request from the second communication device before sending the directive to the second communication device. In some embodiments, the server stores multiple directives received in a memory creating a queue of directives to be sent to the second communication device when requested by the second communication device. In other embodiments, the host device does not store the directive in non-volatile memory, but merely sends the directive to the second communication device.

The directive is then sent to the address of the second communication device and is received by the second communication device. The processor of the second communication device interprets the directive and causes a symbol 844 substantially similar to the symbol 824 to be displayed on the second portion 840 of the canvas 810 (FIG. 7). In some embodiments, the symbol 844 can appear as coming from the section 842 of the second portion 840 of the canvas 840 on the display of the second communication device.

In some embodiments, the processor of the second communication device interprets a behavior profile associated with the symbol 824 contained within the directive and causes the symbol 844 to be displayed on the second portion 840 of the canvas 810 in accordance with the behavior profile. For example, the symbol 844 can be displayed on the second portion 840 of the canvas 810 as moving in a similar path J, with a similar speed, and/or with a similar acceleration as the trace on the display of the first communication device produced to send the first directive (e.g., path I). Additionally, the symbol 844 can be displayed and act in accordance with any other characteristics contained within the behavior profile.

Figure 10:
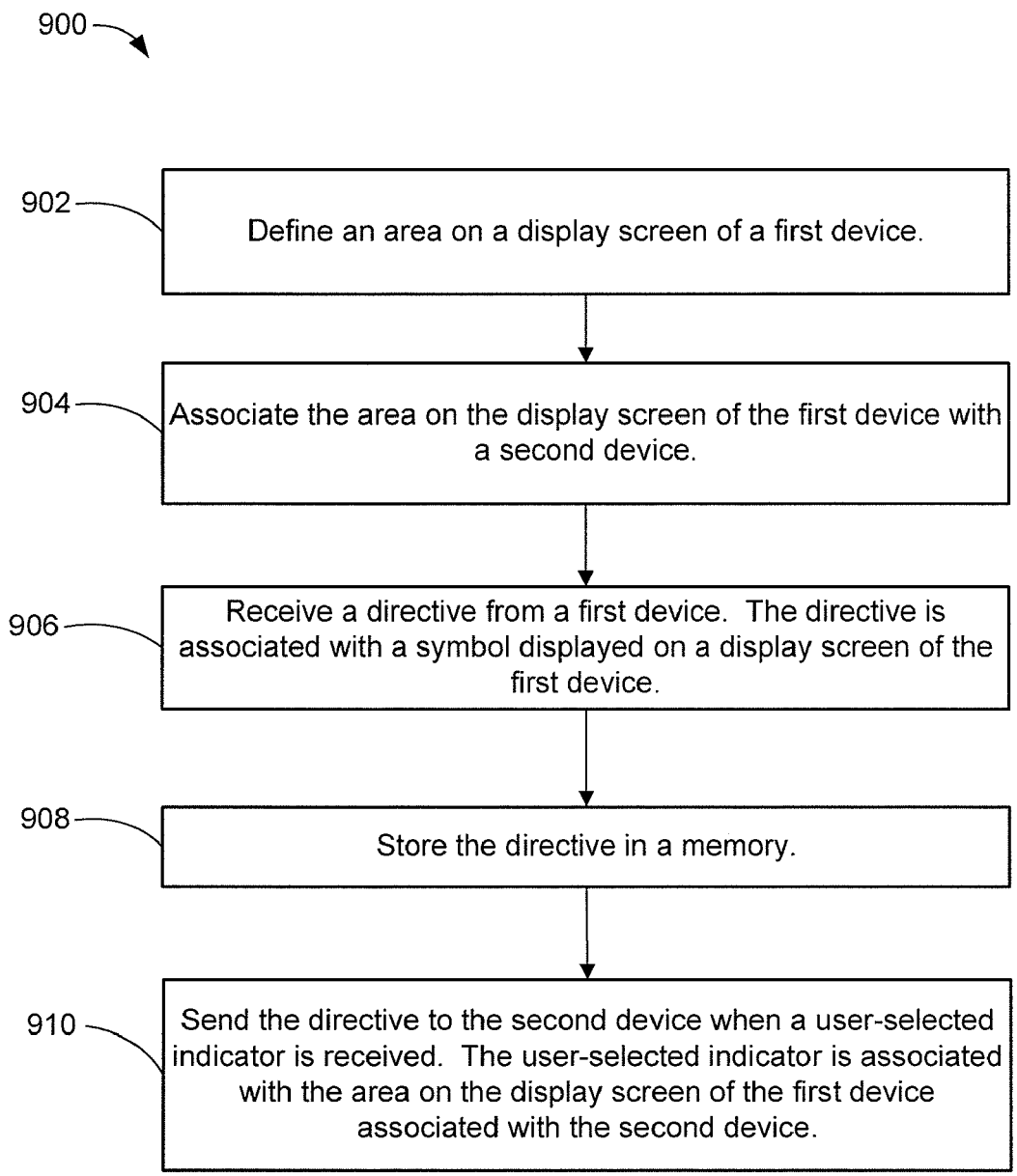
FIG. 10 is a flow chart illustrating a method of transferring a directive from a first device to a second device, according to another embodiment.

FIG. 10 is a flow chart illustrating a method 900 of transferring a directive from a first device to a second device, according to another embodiment. An area is defined on a display of the first device, at 902. In some embodiments, the host device defines the area. In other embodiments, a user defines the area. In still other embodiments, the first device defines the area by a predefined rule set or algorithm.

The area on the display of the first device is associated with the second device, at 904. The area on the display of the first device can be associated with the second device by any method described herein. In some embodiments, for example, the host device can include a table associating location coordinates of the area on the display with the second device. In other embodiments, such a table can be included on the first device itself.

A directive is received from the first device, at 906. The directive is associated with a symbol displayed on a display screen of the first device. In some embodiments, the directive can also include a behavior profile of the symbol. The directive is stored in a memory, at 908.

The directive is sent to a second device when a user-selected indicator is received, at 910. The user-selected indicator is associated with the area on the display screen of the first device associated with the second device. The user-selected indicator can be, for example, sensor data indicating that a user of the first device selected one or more symbols and traced a path to or in the direction of the area on the display screen associated with the second device. In other embodiments, the user-selected indicator can be sensor data indicating that a user performed an action in the area on the display screen associated with the second device.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, for example, a portion of a first device can be associated with any number of devices. In such embodiments, a directive can be sent to, for example, both a second device and a third device (or any number of devices) when a user-selected indicator associated with a portion of a display of the first device is received by the processor of the first device when the portion of the display of the first device is associated with the second device and the third device.

While communication devices are shown and described above as communicating with each other via a host device, in other embodiments, the communication devices can directly send directives to each other. Said another way, in some embodiments, a first communication device can send a directive to a second communication device without sending the directive through an intermediary a host device.

Some embodiments described herein relate to a computer storage product (e.g., memory) with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. For example, while the displays are generally described as touch screens, a non-touch screen display having a pointer such as a mouse pointer can be used. Additionally, while a specific number of portions associated with other devices and/or portions of a canvas are described as being defined on a device or a portion of a canvas, any number of portions of a display and/or a canvas can be defined.

What is claimed is:

1. A method, comprising:
   displaying a first portion of a canvas on a display screen;
   sending a first directive to a remote device associated with a second portion of the canvas when a position of a first symbol on the first portion of the canvas is within an area on the first portion of the canvas uniquely associated with the second portion of the canvas, the first directive causing the remote device associated with the second portion of the canvas to display the first symbol on the second portion of the canvas, the first portion of the canvas being mutually exclusive from the second portion of the canvas; and
   sending a second directive to a remote device associated with a third portion of the canvas when a position of a second symbol on the first portion of the canvas is within an area on the first portion of the canvas uniquely associated with the third portion of the canvas, the second directive causing the remote device associated with the third portion of the canvas to display the second symbol on the third portion of the canvas, the third portion of the canvas being mutually exclusive from the first portion of the canvas and the second portion of the canvas.

2. The method of claim 1, wherein the first portion of the canvas is associated with a first user and the second portion of the canvas is associated with a second user.

3. The method of claim 1, wherein the first directive includes a behavior profile having information about a behavior of the first symbol.

4. The method of claim 1, wherein the first directive includes a behavior profile having information about a motion path of the first symbol.

5. The method of claim 1, wherein the first directive includes a behavior profile having information about a motion path of the first symbol such that the first symbol appears to be moving on the second portion of the canvas in substantially a same path in which the first symbol was moved to the position of the first symbol on the first portion of the canvas when the first symbol is displayed on the second portion of the canvas.

6. The method of claim 1, further comprising:
   receiving a third directive from the remote device associated with the second portion of the canvas, the third directive being associated with a third symbol; and
   displaying the third symbol within the area on the first portion of the canvas uniquely associated with the second portion of the canvas.

7. The method of claim 1, wherein the sending the first directive includes sending the first directive to the remote device associated with the second portion of the canvas when the first symbol is moved from an area on the first portion of the canvas not associated with the second portion of the canvas to the area on the first portion of the canvas uniquely associated with the second portion of the canvas.

8. The method of claim 1, wherein the area on the first portion of the canvas uniquely associated with the second portion of the canvas does not display the second portion of the canvas.

9. A method, comprising:
   receiving a first directive from a first device, the first directive being associated with a first symbol displayed on a display screen of the first device;
   storing the first directive in a memory;
   sending the first directive to a second device when a first user-selected indicator is received, the first user-selected indicator being associated with a first area on the display screen of the first device, the first area being uniquely associated with the second device;
   receiving a second directive from the first device, the second directive being associated with a second symbol displayed on the display screen of the first device;
   storing the second directive in the memory; and
   sending the second directive to a third device when a second user-selected indicator is received, the second user-selected indicator being associated with a second area on the display screen of the first device, the second area being uniquely associated with the third device.

10. The method of claim 9, wherein the first user-selected indicator is received in response to a user initiated indication on the display screen associated with moving the first symbol in a direction of the first area on the display screen.

11. The method of claim 9, wherein the first user-selected indicator is received in response to a user initiated indication within the first area on the display screen.

12. The method of claim 9, wherein the first directive contains an image resource.

13. The method of claim 9, wherein the first directive includes a behavior profile having information about a behavior of the first symbol.

14. The method of claim 9, wherein the first directive is sent to the second device when the second device is active at a time subsequent to the receiving the first directive from the first device, the second device is inactive when the first directive is received from the first device.

15. The method of claim 9, further comprising:
   defining the first area on the display screen of the first device; and
   associating the first area on the display screen of the first device with the second device.

16. The method of claim 9, further comprising:
   sending a notification to the second device prior to sending the first directive to the second device.

17. A device, comprising:
   a processor;
   a display screen; and a memory containing instructions to cause the processor to uniquely associate a first portion of the display screen with a first remote mobile device, the processor configured to send a first directive to the first remote mobile device when the processor receives a signal indicating an action was performed within the first portion of the display screen, the first directive being associated with a first symbol, the processor configured to uniquely associate a second portion of the display screen with a second remote mobile device, the processor configured to send a second directive to the second remote mobile device when the processor receives a signal indicating an action was performed within the second portion of the display screen, the second directive being associated with a second symbol, the first portion of the display screen being mutually exclusive from the second portion of the display screen.

18. The device of claim 17, wherein the signal indicating the action was performed within the first portion of the display screen is received when a user enters the first symbol within the first portion of the display screen.

19. The device of claim 17, wherein the signal indicating the action was performed within the first portion of the display screen is received when a user moves the first symbol in a direction of the first portion of the display screen.

20. The method of claim 9, further comprising:
receiving the first user-selected indicator in response to the first symbol being moved from an area on the display screen of the first device not associated with the second device to the first area on the display screen of the first device.

21. The device of claim 17, wherein the signal indicating that the action was performed within the first portion of the display screen is received when the first symbol is moved from a portion of the display screen not uniquely associated with the first remote mobile device to the first portion of the display screen.

* * * * *